Feb. 22, 1955

S. A. FRYE 2,702,707

APPARATUS FOR HANDLING BOWLING PINS

Filed Aug. 16, 1946

Inventor
Sanders A. Frye

By

Attorney

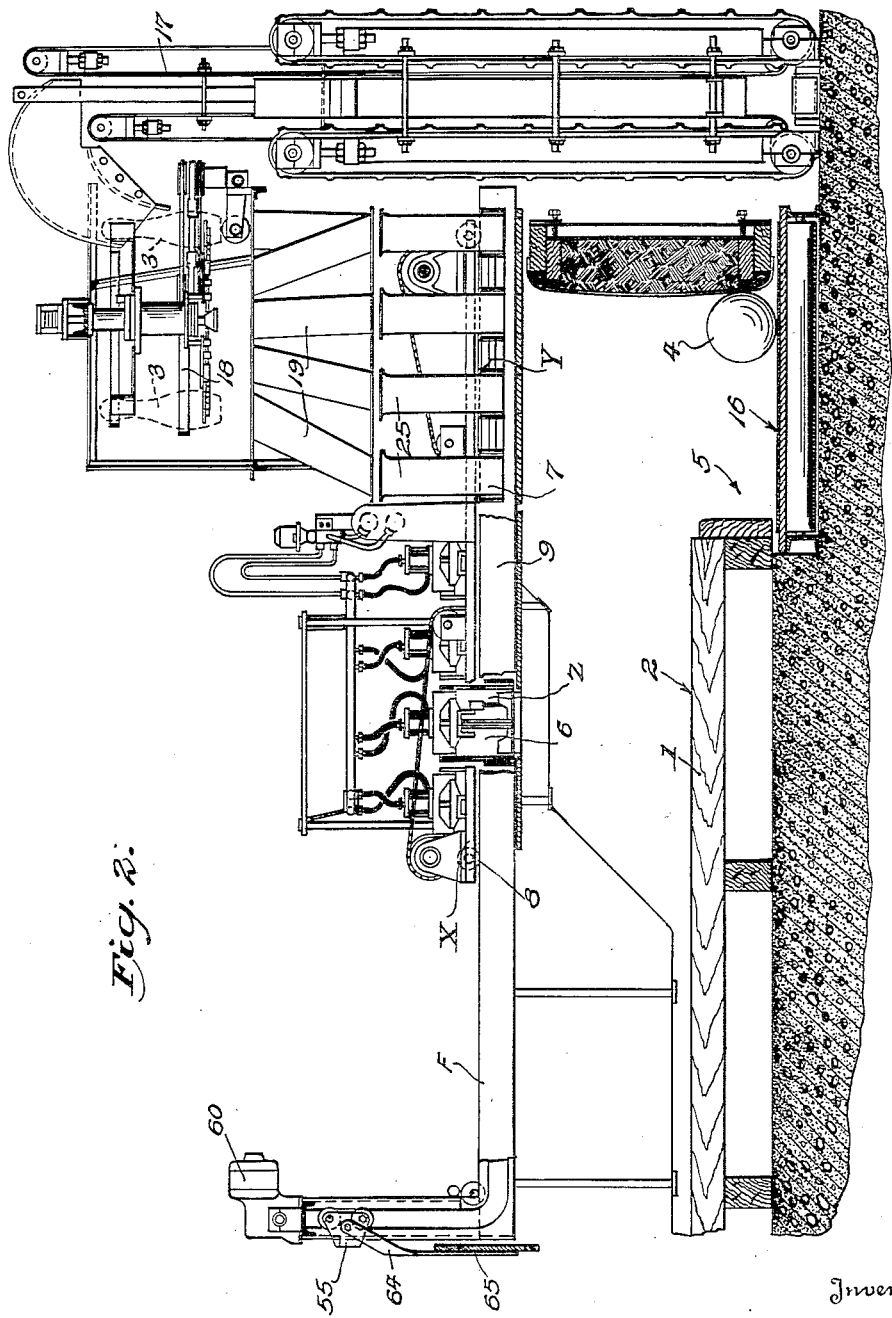

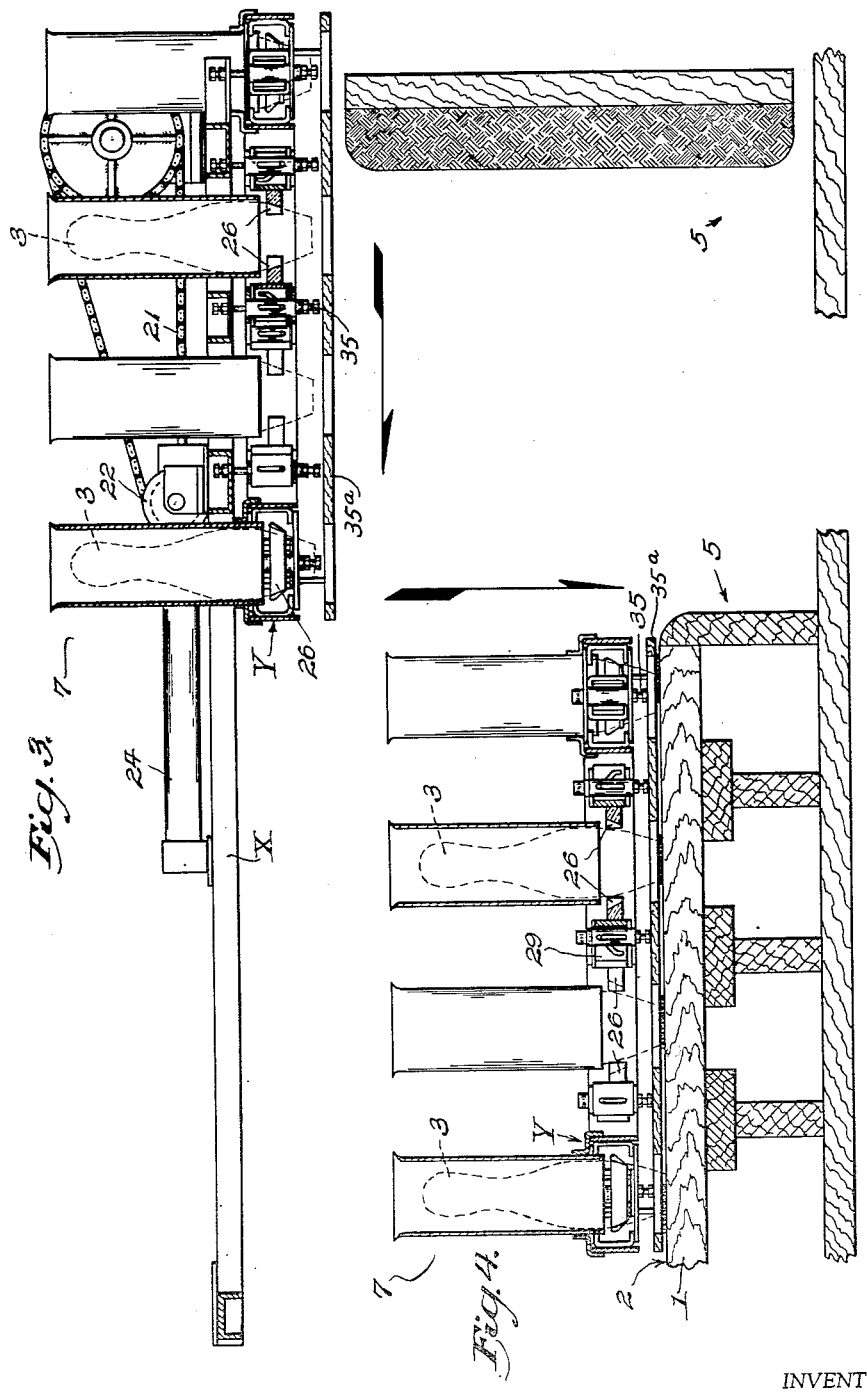

Feb. 22, 1955 S. A. FRYE 2,702,707
APPARATUS FOR HANDLING BOWLING PINS
Filed Aug. 16, 1946 25 Sheets-Sheet 4

INVENTOR.
Sanders A. Frye
BY
Attorney

Feb. 22, 1955
S. A. FRYE
2,702,707
APPARATUS FOR HANDLING BOWLING PINS
Filed Aug. 16, 1946
25 Sheets-Sheet 5
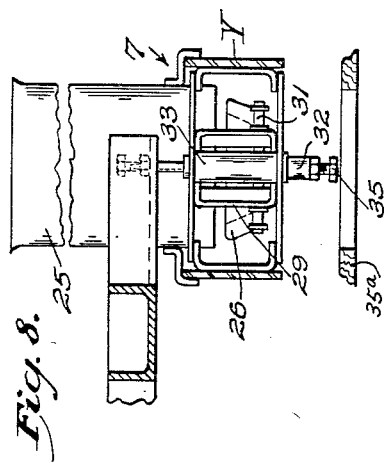
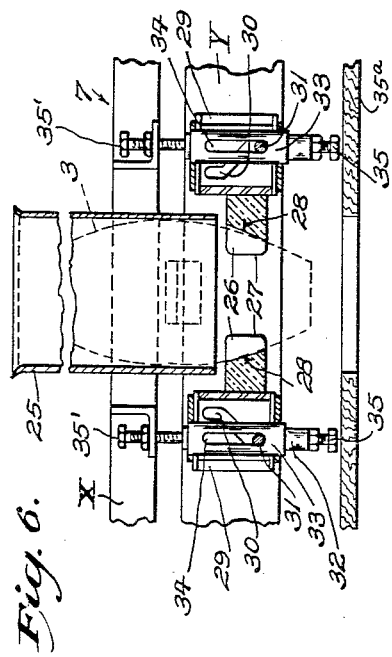
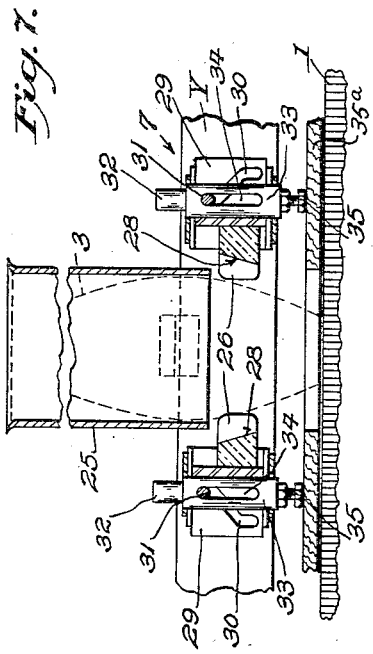
INVENTOR.
Sanders A. Frye
BY
*N. D. McDowell*
ATTORNEY

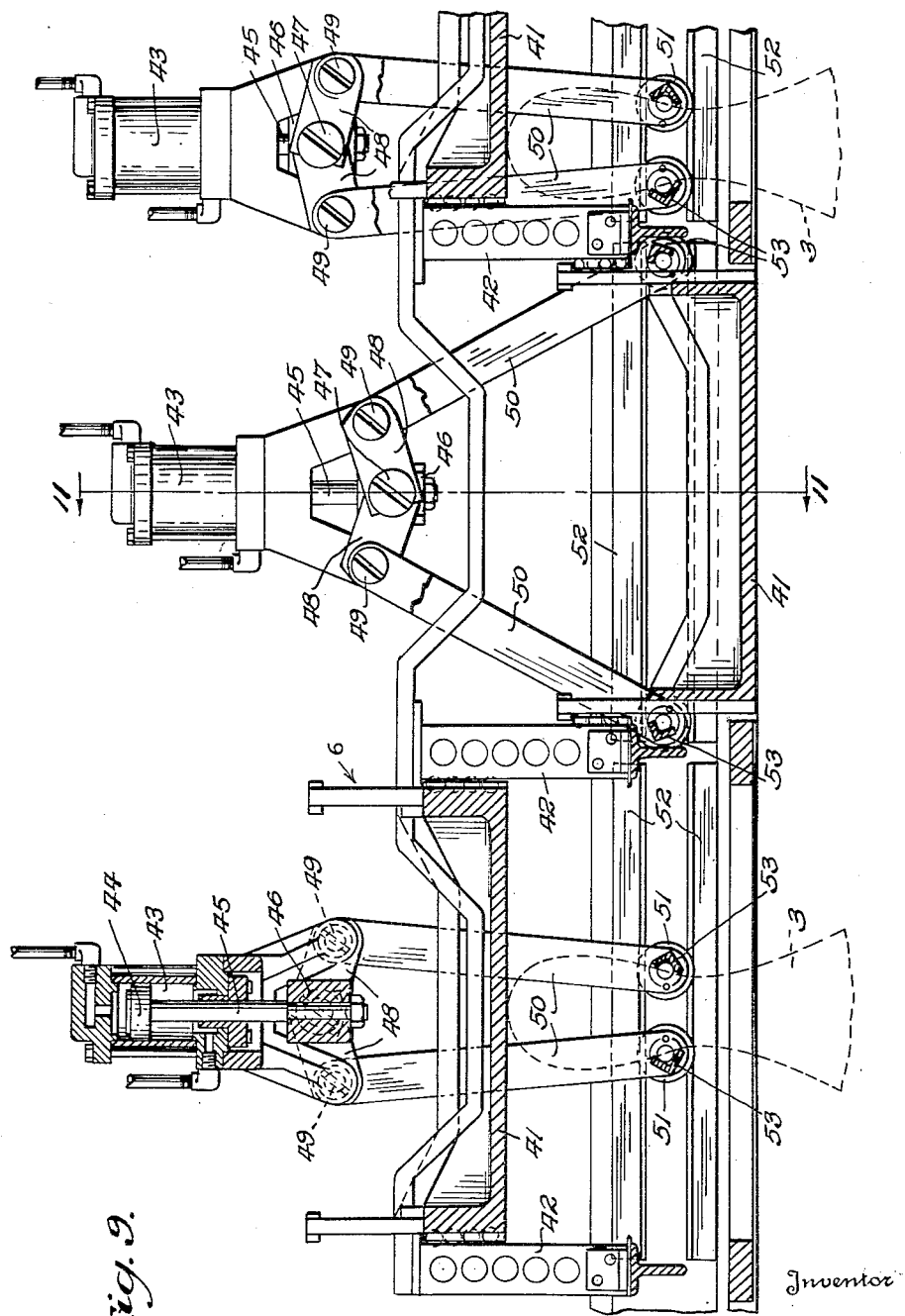

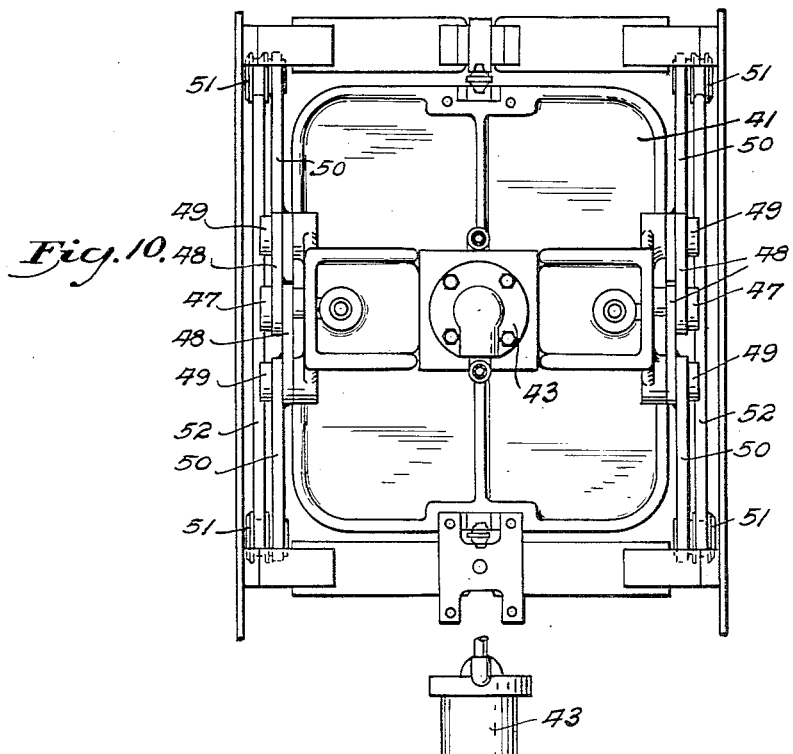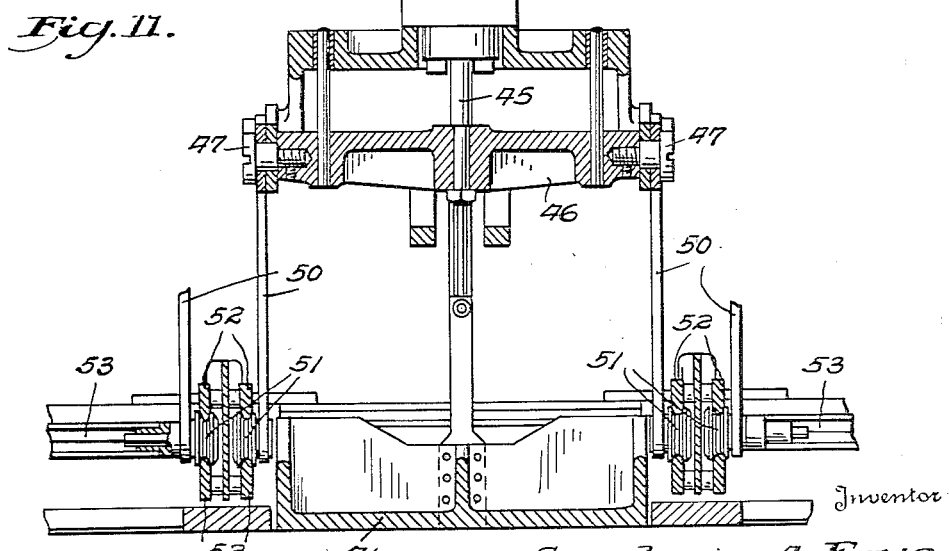

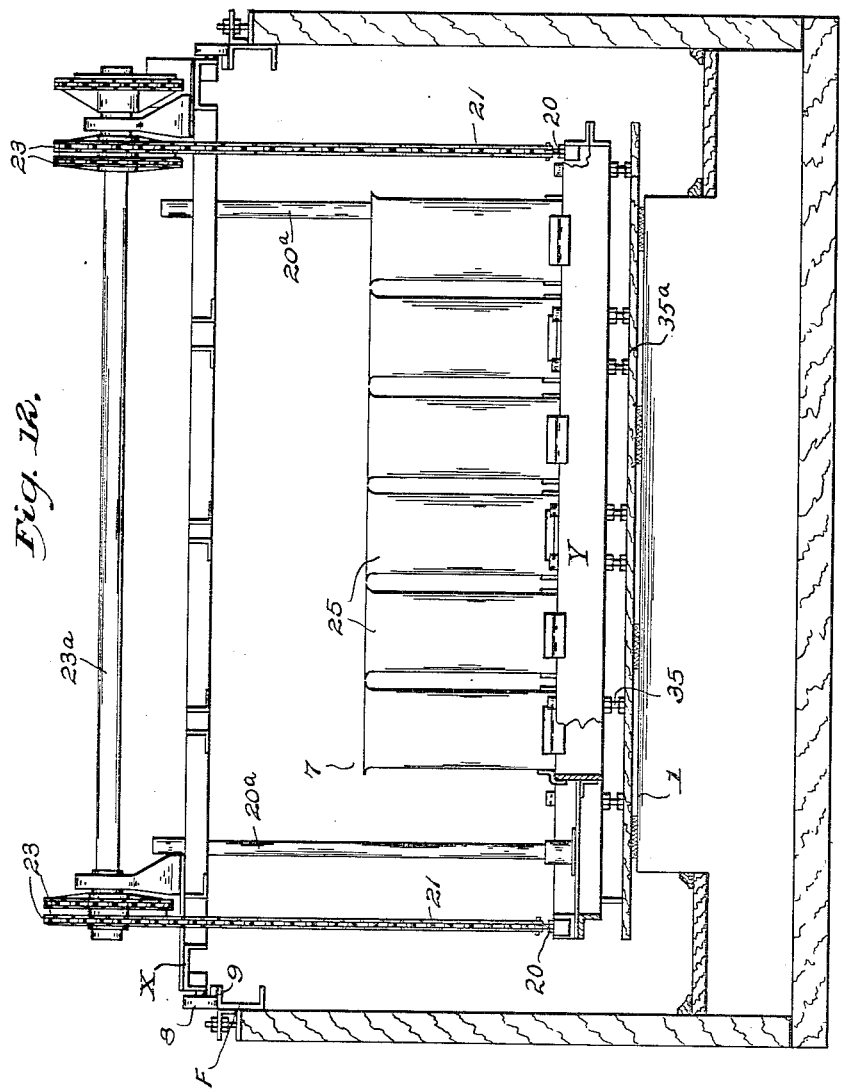

Feb. 22, 1955  S. A. FRYE  2,702,707
APPARATUS FOR HANDLING BOWLING PINS
Filed Aug. 16, 1946  25 Sheets-Sheet 9
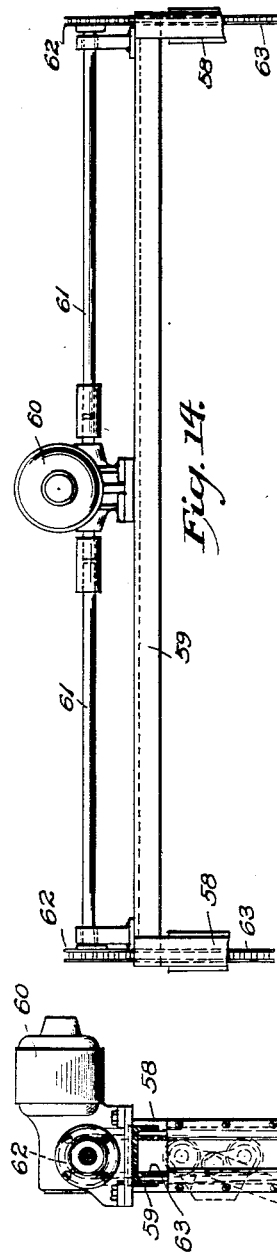
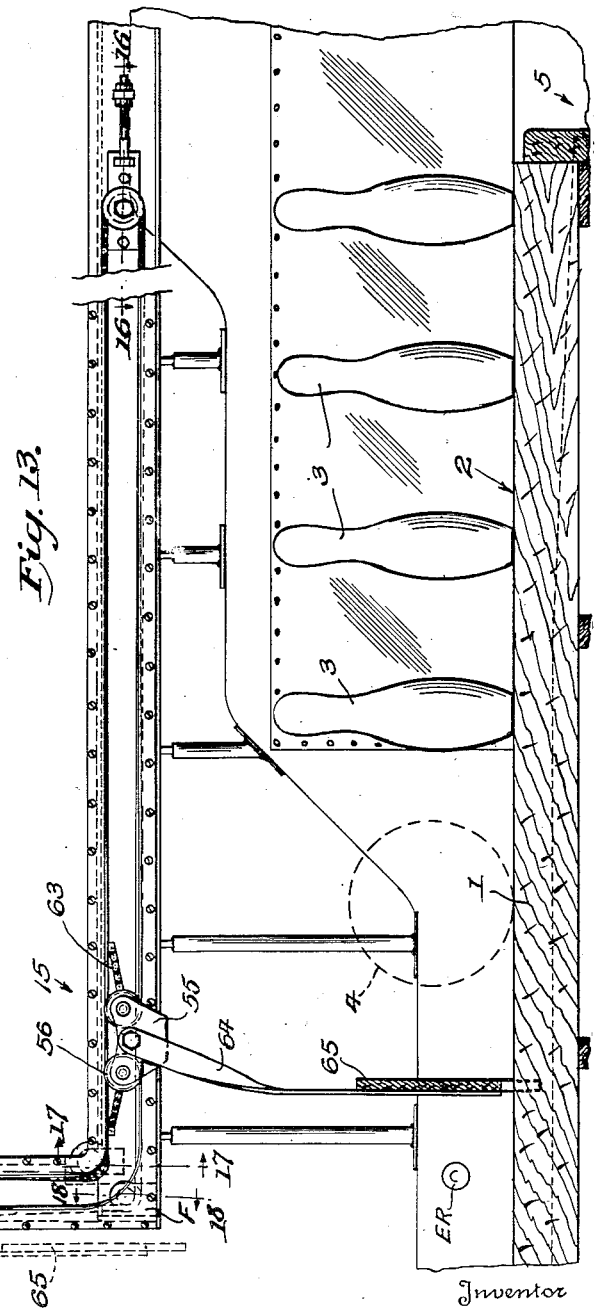
Inventor
Sanders A. Frye
By
Attorney Feb. 22, 1955     S. A. FRYE     2,702,707
APPARATUS FOR HANDLING BOWLING PINS
Filed Aug. 16, 1946     25 Sheets-Sheet 10
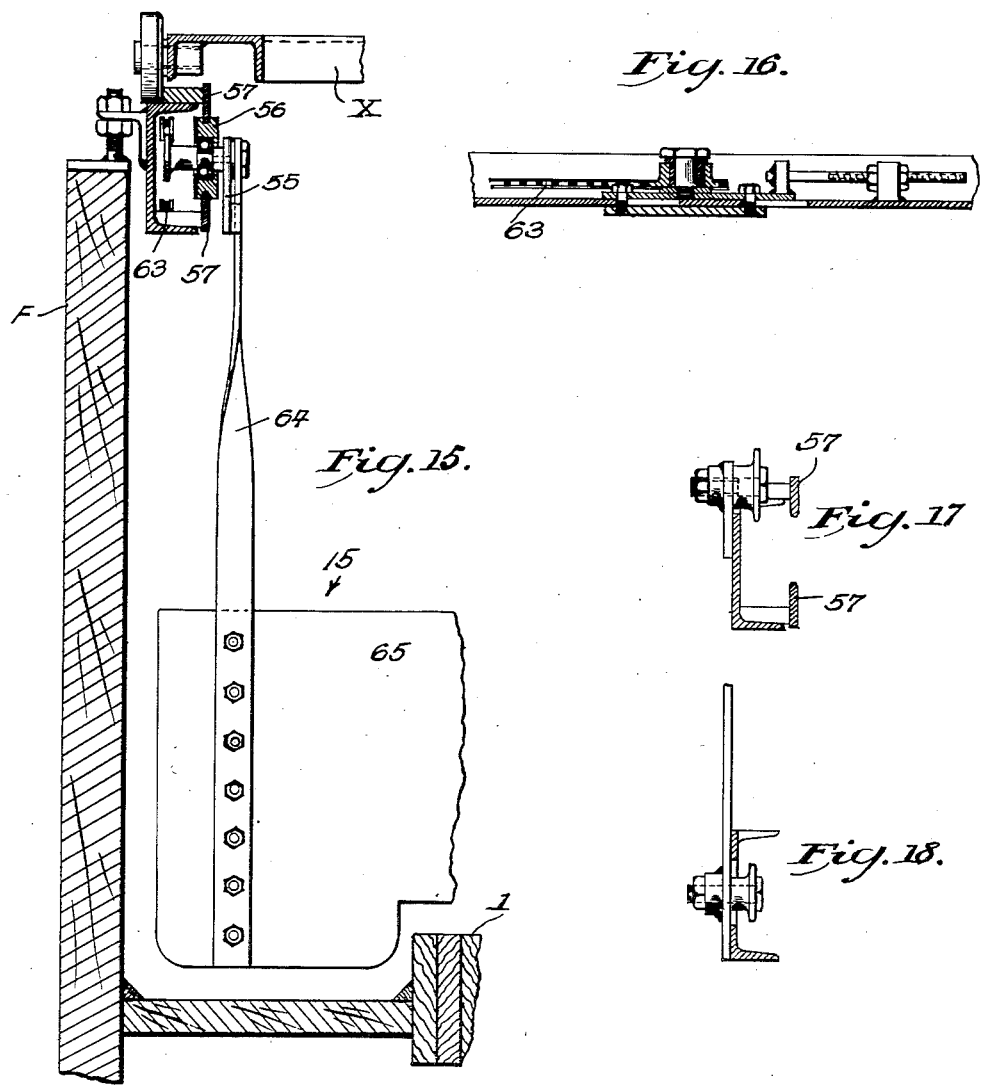
Inventor
Sanders A. Frye
Attorney Feb. 22, 1955 S. A. FRYE 2,702,707
APPARATUS FOR HANDLING BOWLING PINS
Filed Aug. 16, 1946 25 Sheets-Sheet 11

Inventor
Sanders A. Frye
By H. J. McDowell
Attorney

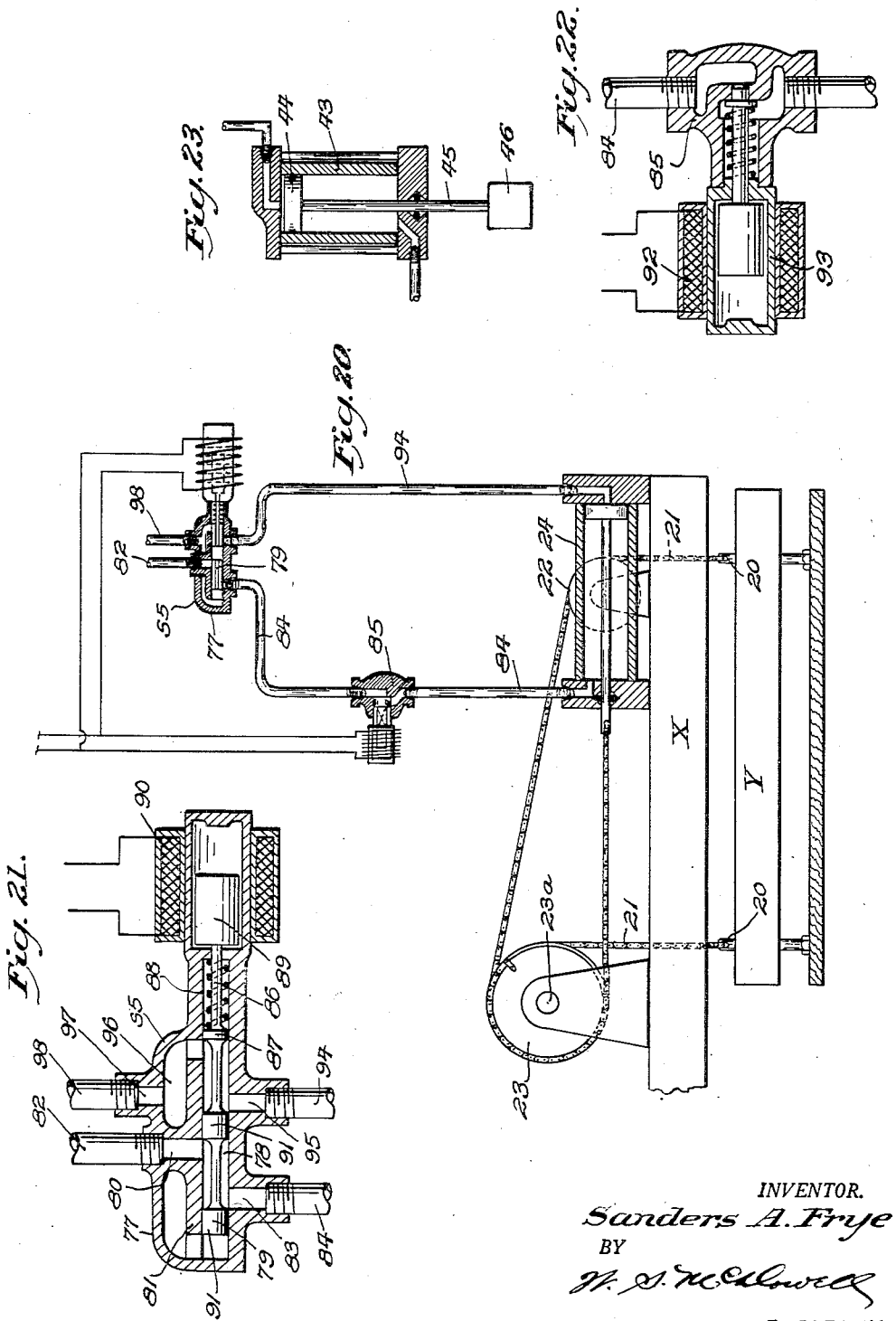

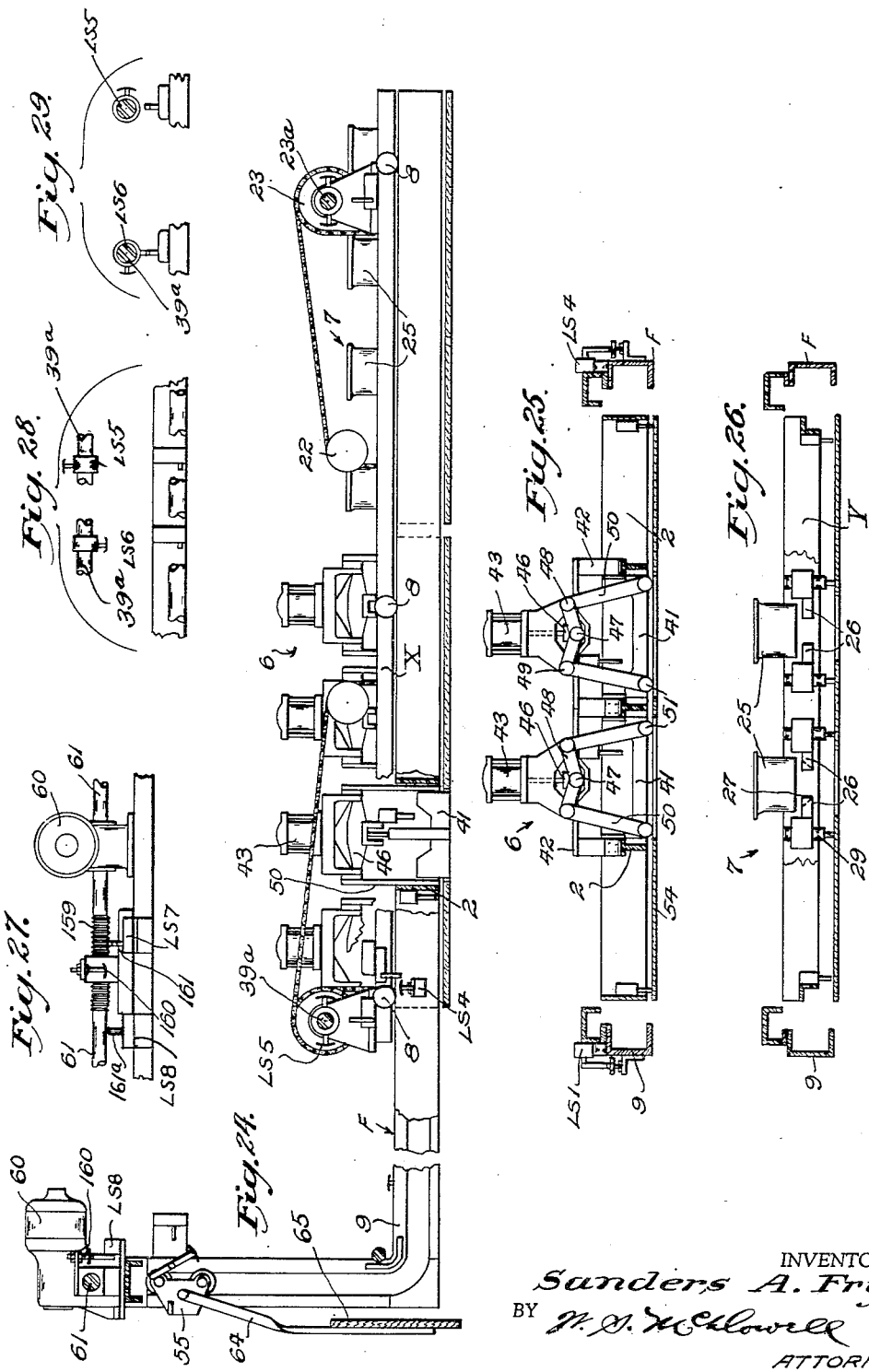

Feb. 22, 1955        S. A. FRYE        2,702,707
APPARATUS FOR HANDLING BOWLING PINS
Filed Aug. 16, 1946        25 Sheets-Sheet 14
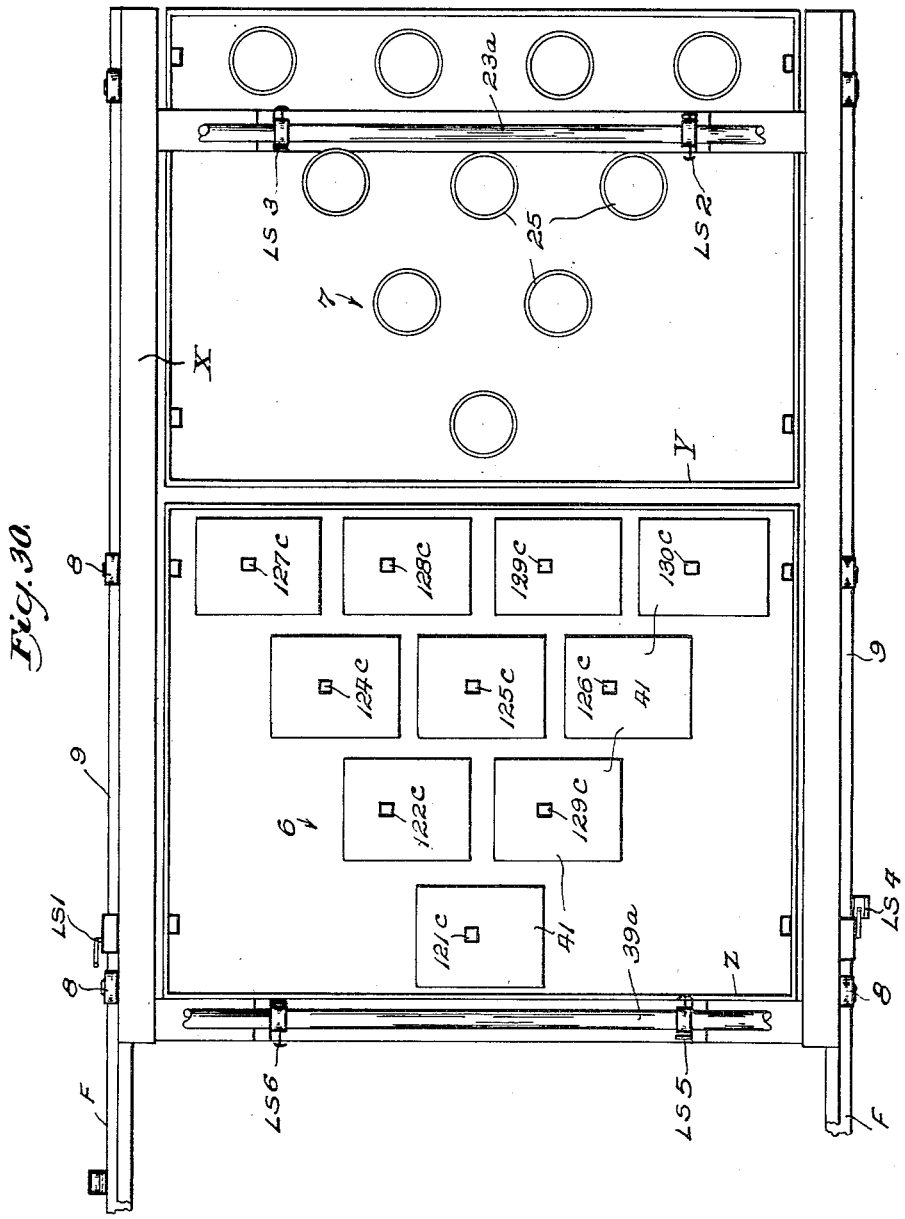
INVENTOR.
Sanders A. Frye
BY
ATTORNEY

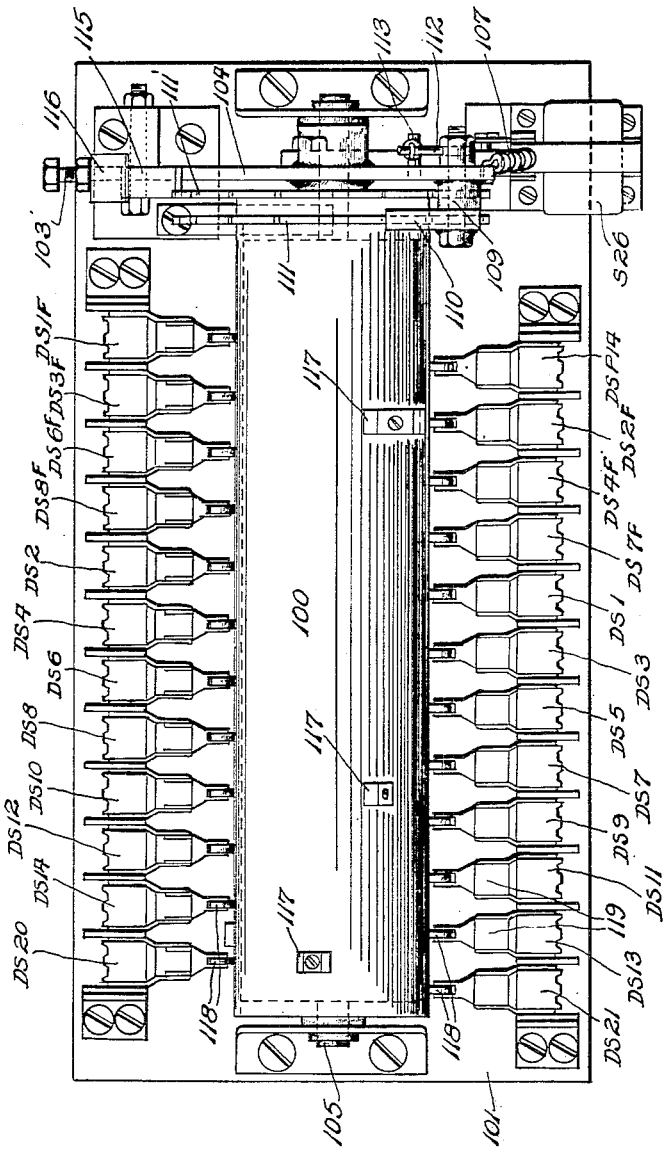

Feb. 22, 1955 S. A. FRYE 2,702,707
APPARATUS FOR HANDLING BOWLING PINS
Filed Aug. 16, 1946 25 Sheets-Sheet 16
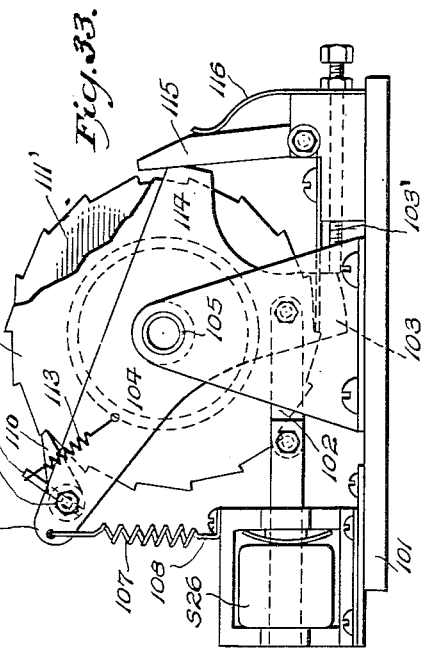
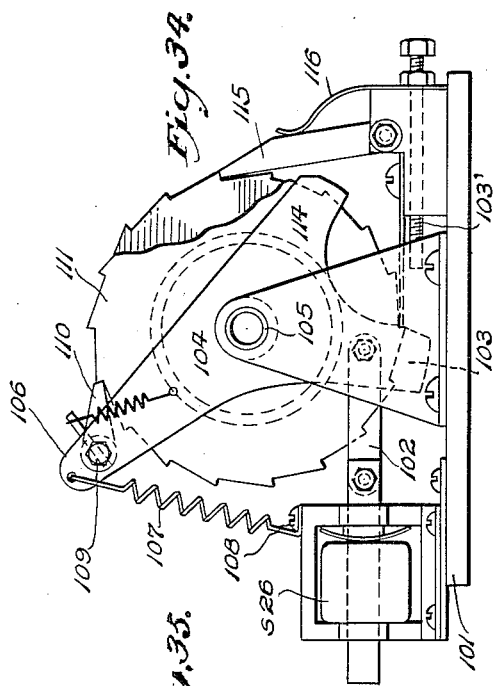
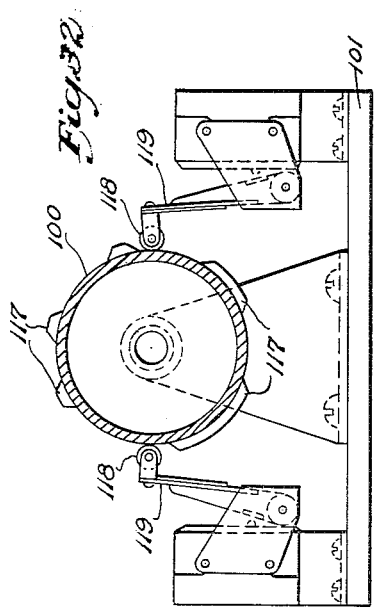
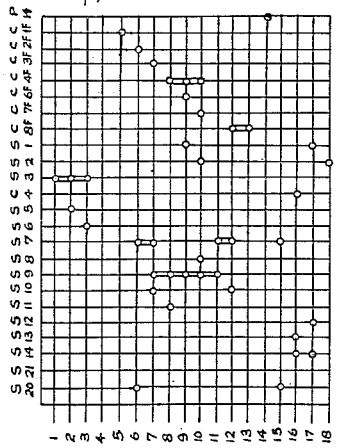
Inventor
Sanders A. Frye
By N. A. McHowell
Attorney Feb. 22, 1955 S. A. FRYE 2,702,707
APPARATUS FOR HANDLING BOWLING PINS
Filed Aug. 16, 1946 25 Sheets-Sheet 17

INVENTOR.
Sanders A. Frye
BY
ATTORNEY

Feb. 22, 1955 S. A. FRYE 2,702,707
APPARATUS FOR HANDLING BOWLING PINS
Filed Aug. 16, 1946 25 Sheets-Sheet 18
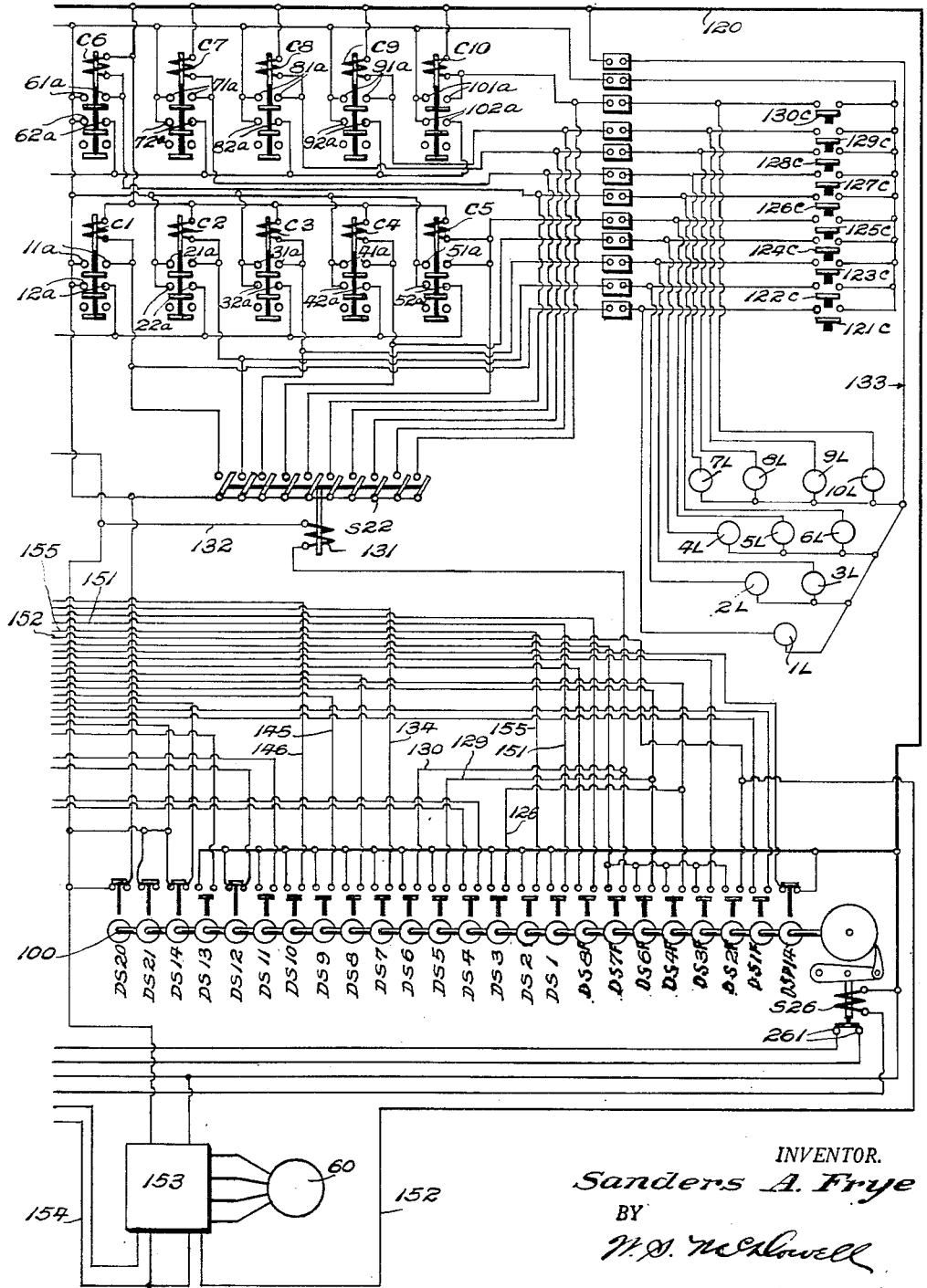
Fig. 36ᵃ
INVENTOR.
Sanders A. Frye
BY
ATTORNEY Feb. 22, 1955     S. A. FRYE     2,702,707
APPARATUS FOR HANDLING BOWLING PINS
Filed Aug. 16, 1946     25 Sheets-Sheet 19

Inventor
Sanders A. Frye
By W. D. McDowell
Attorney

Feb. 22, 1955

S. A. FRYE 2,702,707

APPARATUS FOR HANDLING BOWLING PINS

Filed Aug. 16, 1946

Inventor
Sanders A. Frye
By W. S. McDowell
Attorney

Feb. 22, 1955  S. A. FRYE  2,702,707
APPARATUS FOR HANDLING BOWLING PINS
Filed Aug. 16, 1946  25 Sheets-Sheet 21

Inventor
Sanders A. Frye
By
Attorney

Inventor
Sanders A. Frye
By H. S. McDowell
Attorney

Feb. 22, 1955          S. A. FRYE          2,702,707
APPARATUS FOR HANDLING BOWLING PINS
Filed Aug. 16, 1946          25 Sheets-Sheet 23

Inventor
Sanders A. Frye

By
Attorney

Inventor
Sanders A. Frye

Feb. 22, 1955  S. A. FRYE  2,702,707
APPARATUS FOR HANDLING BOWLING PINS
Filed Aug. 16, 1946  25 Sheets-Sheet 25
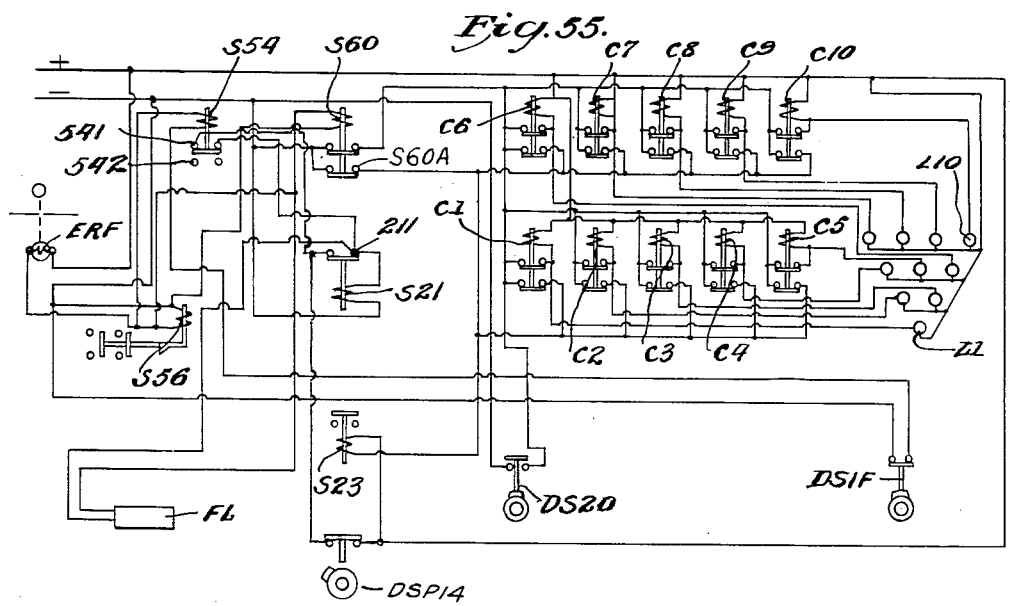
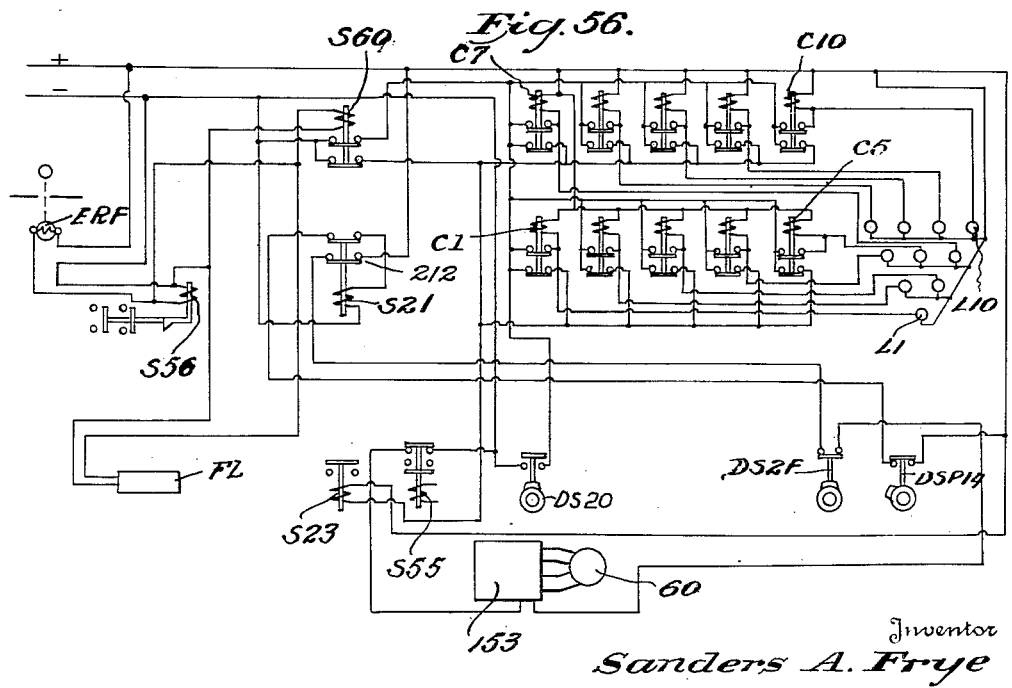
Inventor
Sanders A. Frye
By W. S. McDowell
Attorney

United States Patent Office 2,702,707
Patented Feb. 22, 1955

2,702,707

APPARATUS FOR HANDLING BOWLING PINS

Sanders A. Frye, Westerville, Ohio, assignor, by mesne assignments, to American Machine and Foundry Company, Brooklyn, N. Y., a corporation of New Jersey Application August 16, 1946, Serial No. 691,042

11 Claims. (Cl. 273—43)

This invention relates to automatic bowling pin and ball-handling apparatus, having particular reference to automatic apparatus of the type wherein the use of pit attendants, usually employed in the manual gathering and setting of pins and the return of rolled balls, is rendered unnecessary. In a more specific aspect, the invention is concerned with an improved control system for such apparatus.

In accordance with the present invention, my improved apparatus comprises broadly a pin-setting mechanism in which the pins are placed and thereafter deposited in properly grouped order on the pin-receiving area of an associated alley bed; a pin-resetting mechanism by which the pin or pins, which remain standing on an alley bed after a first-rolled ball has struck the initially placed group of standing pins, may be elevated above the alley bed to permit a sweeping mechanism to remove any fallen pins present on the alley bed, the resetting mechanism thereafter restoring the elevated pins to the alley bed when the sweeping mechanism returns to its normal position; also there is present a mechanism for removing pins and balls from the alley pit, returning the balls to the player's position and delivering the pins to the pin-setting mechanism.

The apparatus comprising the pin-setting mechanism constitutes the subject of my prior application, Serial No. 577,367, filed February 12, 1945, now United States Patent No. 2,550,919 issued May 1, 1951; the pin-resetting mechanism is disclosed and claimed in my prior application, Serial No. 544,381, filed July 11, 1944, now United States Patent No. 2,530,385 issued November 21, 1950; and the mechanism for removing the pins and balls from the pits of such alleys is claimed in my prior application, Serial No. 628,040, filed November 13, 1945, now United States Patent No. 2,622,879 issued December 23, 1952. The present application, therefore, constitutes a continuation-in-part of my aforesaid patents.

It is a primary object of this invention to provide means for coordinating the operation of the above-identified mechanisms, so that the same will become automatically active or inactive in proper sequential order in carrying out their respective functions.

For a further understanding of the invention, reference is to be had to the following description and the accompanying drawings, wherein:

Fig. 1 is a perspective view disclosing the automatic bowling alley mechanism comprising the present invention;

Fig. 2 is a view partly in vertical longitudinal section and in side elevation of said mechanism;

Fig. 3 is a similar view disclosing the pin-setting mechanism in its elevated or inactive position;

Fig. 4 is a transverse vertical sectional view taken through the pin-setting mechanism when in its lowered position for the deposit of pins carried thereby on the bed surface of a bowling alley;

Fig. 6 is a fragmentary vertical sectional view taken through a portion of the pin-setting mechanism when in its elevated position, disclosing the jaws of the mechanism arranged to receive a bowling pin from one of the distributor tubes;

Fig. 7 is a similar view disclosing the jaws in retracted position when discharging a bowling pin on an alley bed;

Fig. 8 is a vertical transverse sectional view, taken at right angles to the plane of Fig. 6;

Fig. 9 is a vertical transverse sectional view taken through the resetting or pin-raising and lowering mechanism;

Fig. 10 is a top plan view of one of the units of the resetting mechanism;

Fig. 11 is a vertical transverse sectional view taken on the plane indicated by the line 11—11 of Fig. 9;

Fig. 12 is a rear elevational view of the pin-setting mechanism;

Fig. 13 is a vertical longitudinal sectional view, disclosing the pin-sweeping mechanism;

Fig. 14 is a detail rear elevational view of the electric motor and its associated shafts for operating the sweeping mechanism;

Fig. 15 is a fragmentary vertical transverse sectional view taken through the sweeping mechanism;

Fig. 16 is a detail horizontal sectional view on the line 16—16 of Fig. 13, and disclosing the take-up adjustment for the chains of the sweep mechanism;

Fig. 17 is a detail vertical transverse sectional view on the line 17—17 of Fig. 13;

Fig. 18 is a similar view on the line 18—18 of Fig. 13;

Fig. 20 is a sectional view taken through the solenoid valves and the actuating cylinder of the pin-setting mechanism;

Fig. 21 is an enlarged vertical sectional view taken through one of the solenoid valves;

Fig. 22 is a similar view of the associated check valve;

Fig. 23 is a sectional view taken through one of the valves of the resetting mechanism;

Fig. 24 is a side elevational view, partly in vertical section, disclosing the relative positions of the setting, resetting and sweeping mechanisms;

Fig. 25 is a transverse sectional view taken through the resetting mechanism;

Fig. 26 is a similar view disclosing the setting mechanism;

Fig. 27 is a detail elevational view of the motor driven shaft for the sweep mechanism and disclosing one of the limit switches for controlling the operation of the sweep mechanism motor;

Fig. 28 is a diagrammatic view of the limit switches employed on the operating shaft of the resetting mechanism;

Fig. 29 is a transverse sectional view taken at right angles to the plane of Fig. 28;

Fig. 30 is a diagrammatic top view of the setting and resetting mechanisms and their associated supporting carriage, disclosing the locations of the limit switches;

Fig. 31 is a top plan view of the drum-operated control switch;

Fig. 32 is a vertical transverse sectional view taken through said switch;

Fig. 33 is an end elevational view of the switch disclosing same in one position of operation;

Fig. 34 is a similar view disclosing the ratchet mechanism for operating the drum switch in another position;

Fig. 35 is a diagrammatic view illustrating the arrangement of the cams on the main control switch;

Fig. 36a is a similar view of the remaining circuits of the complete system;

Figure 5:
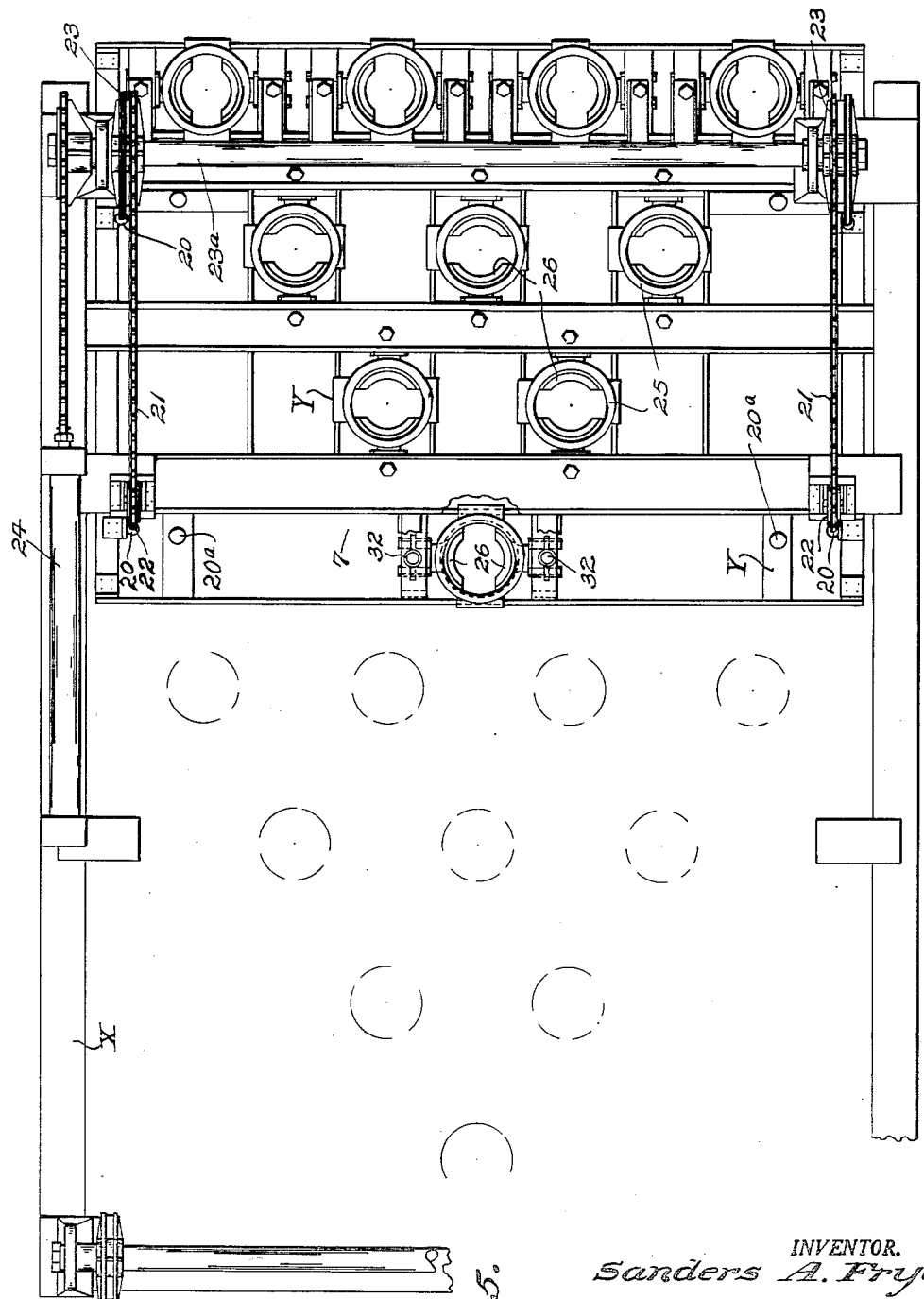
Fig. 5 is a top plan view of the pin-setting mechanism.

Figs. 37 to 54, inclusive, are diagrammatic views showing the circuits involved in each of the 18 working positions of the switch-actuating controller drum during a normal bowling sequence in which a "strike," "spare" or "foul" is not encountered.

Figs. 55 and 56 are diagrammatic views disclosing the circuits when a "foul" sequence is encountered.

Referring more particularly to the drawings, my improved automatic bowling alley embodies a stationary frame structure F. This frame structure is arranged at the rear of the elongated bed of the alley 1 and is disposed in a horizontal plane above the pin-receiving area 2 of the alley, so that it will not interfere with the positioning of the bowling pins 3 on the area 2 nor the rolling of the balls 4. The rear of the frame structure is arranged above the pit 5 of the alley, providing space for the collection, segregation and handling of the pins and balls deposited in the pit during the course of the game.

Supported on the frame structure for limited reciprocating movement in a horizontal plane is a frame X which effects the support of a pin-resetting mechanism, indicated generally by the numeral 6, and a pin-setting mechanism, indicated generally at 7. By reciprocating the frame X, either the resetting mechanism 6 or the pin-setting mechanism 7 carried thereby is selectively registered with the pin-receiving area 2 of the alley 1. The frame X carries rollers 8 which operate on tracks 9 forming a part of the frame structure F, whereby to facilitate bodily movement on the part of the frame X and the mechanism supported thereby.

Figure 19:
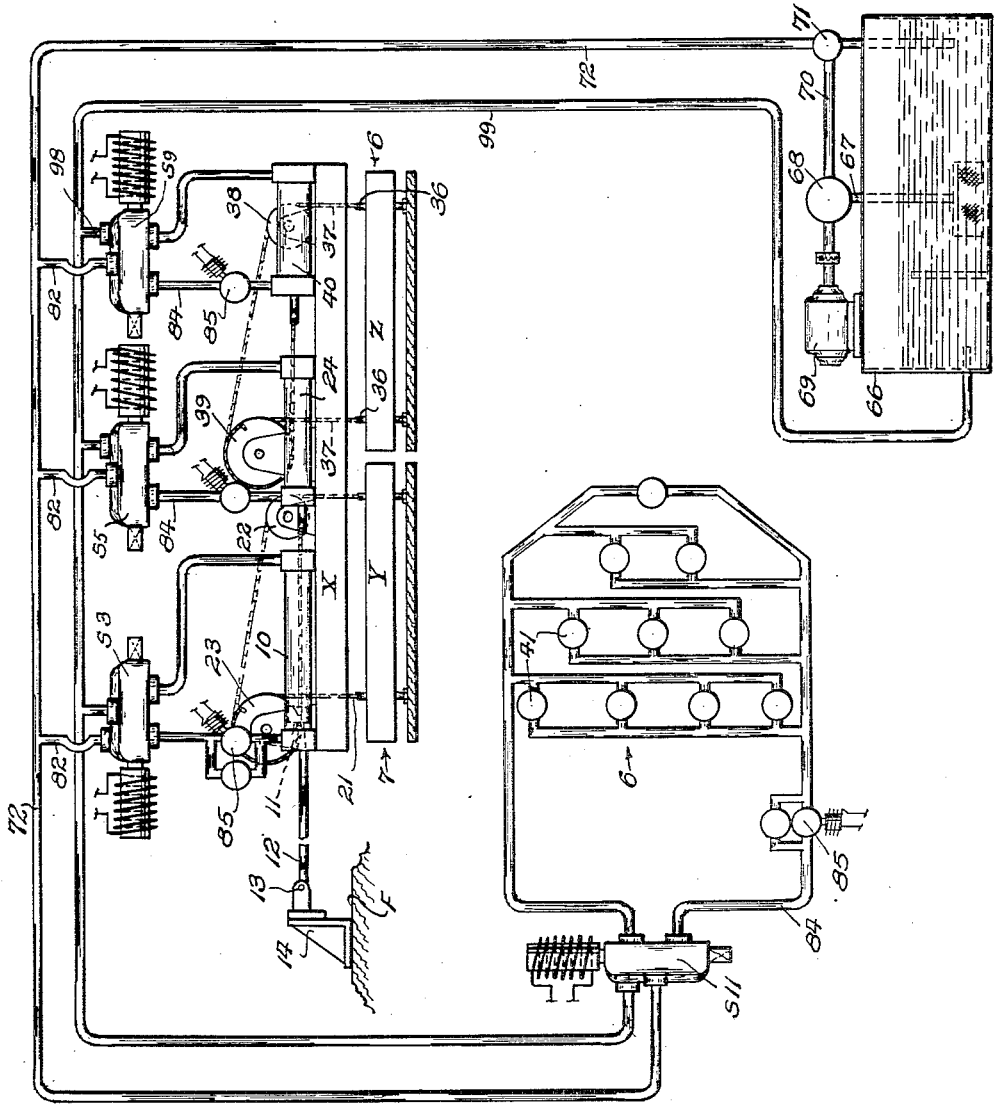
Fig. 19 is a diagrammatic view disclosing the solenoid-actuated valves and associated hydraulic circuits for actuating the sliding carriage of the machine and effecting the raising and lowering of the pin-setting and resetting units.

Conveniently, the shifting of the frame X may be accomplished at timed intervals through the employment of one or more cylinders 10 stationarily mounted on said frame. Within each of said cylinders, as shown in Fig. 19, there is positioned a piston 11 which is connected with a rod 12, the latter extending through and beyond one end of the cylinder, having its outer end joined as at 13 to a bracket 14 fixed upon the frame structure F, or other equivalent support. By means hereinafter defined, fluid is admitted into the cylinder or cylinders 10 and exhausted therefrom to cause the frame X to slide horizontally on the frame structure F to effect selective registration of the mechanisms indicated at 6 and 7 with the pin-receiving area 2 of said alley.

As stated, the frame X carries the resetting mechanism 6, and by means of this mechanism, bowling pins, standing on the alley, after the first ball of a frame has been rolled, are elevated from the alley surface, whereby to permit the actuation of a sweep mechanism, indicated generally by the numeral 15. This sweep mechanism serves to remove the pins which fall on the alley after the rolling of the first ball, or which remain standing at the end of a bowling frame.

When the sweep mechanism returns to its normal position, spaced from the alley and supported on the front of the frame structure F, the pins gripped and supported by the mechanism 6 are lowered and re-deposited on the alley surface in exactly the same positions as when they were first engaged and elevated by the mechanism 6. The pins which are delivered to the pit 5 are deposited on one or more conveyors 16 and are delivered thereby to a pin elevator, indicated diagrammatically at 17, which elevates the pins and deposits the same in grouped order in a collector ring 18. When ten of such pins are grouped in the collector ring, the supports for the pins in said ring are released automatically, causing the pins to drop simultaneously into distributor tubes shown at 19, which conduct the pins to the setting-mechanism 7 for re-deposit on the alley surface.

The conveyor 16, the pin elevator 17, the collector ring 18 and the tubes 19 have been shown and described in my aforesaid Patent No. 2,622,879.

The pin-setting mechanism 7 may be of the type disclosed in my prior Patent No. 2,550,919. This mechanism comprises a frame Y carrying studs 20 with which are connected the lower ends of a plurality of chains 21. A forward pair of these chains pass around guides 22 carried by the frame X, and the opposite ends of said forward pair of chains and the upper ends of a rearwardly located pair of chains are fastened to sprocket wheels 23, or their equivalents, fixed to a shaft 23a which is journaled for rotation on the frame X. The sprockets are rotated by a fluid-actuated motor unit 24 which is mounted on the frame X, and which functions to control the elevation and descent of the frame Y in a manner which will be hereinafter more fully described. Sway-preventing guide rods 20a project rigidly upwardly from the frame Y and are slidably received in openings therefor provided in the frame X.

The frame Y is provided with a plurality of open-ended stationary tubes 25, in which the bowling pins are deposited from the distributing tubes 19. Below the open lower ends of the tubes 25, the frame Y carries pin-supporting blocks 26, having recesses 27 formed with angular walls 28, so that a pair of blocks for each of the tubes 25, when normally positioned, will engage the lower ends of the pins, beneath their horizontal planes of greatest diameter, in order to support the pins in the tubes 25.

The blocks 26 are carried by laterally movable holders 29, which have the side walls thereof formed with substantially Z-shaped slots 30. The slot of each of these holders receives a transversely extending pin 31 which is carried by a vertically movable stem 32 mounted for vertical movement in a sleeve 33, the latter being slotted as at 34 for the reception of the pin 31. The bottom of each of the stems 32 is formed with adjustable alley-engaging threaded device 35. It will be seen that when the frame Y is lowered, the threaded devices, upon striking the alley surface, will be forced upwardly. A flat horizontally disposed vertically movable contact frame 35a may be suspended from the lower part of the frame Y to engage the alley surface in actuating the devices 35, the frame 35a serving to prevent said devices from directly contacting the alley surface and thereby marring or otherwise injuring the same.

Due to the Z-shaped formation of the slots 30, the holders 29 will be moved laterally so that the blocks 26 thereof will be separated sufficiently to permit the pins contained in the tubes 25 to drop on the alley surface. The holders remain so separated or spaced when the frame Y is being elevated so as not to interfere with the deposited pins, since positive actuation is required to move the holders. But when the frame Y substantially reaches the limit of its upward movement, the upper ends of the stems 32 contact with adjustable stops 35' carried by the frame X to force said holders together so that the blocks 26 will be positioned to receive and support pins delivered thereto by the distributing tubes 19.

The pin re-setting mechanism 6 comprises a frame Z. This frame is formed with upstanding studs 36 to which are fastened the lower ends of a plurality of chains 37. The forwardly disposed pair of chains 37, as shown in Fig. 19 have their lower ends fastened to the forward part of the frame Z and extend upwardly therefrom, passing over guides 38 mounted on the frame X, and the opposite or rear ends of said forwardly disposed chains pass around and are secured to sprockets 39 fixed to the shaft 39a which is rotatably mounted on the frame X. The rearwardly disposed pair of chains 37 have their lower ends secured to the frame Z and extend upwardly to the sprocket assembly 39 around which the rearward pair of chains pass and are secured, whereby rotation of the sprocket assembly 39 raises or lowers the frame Z. The frame X carries a fluid-actuated motor unit 40 so constructed that by its timed operation, in a manner hereinafter defined, the frame Z may be moved between lowered and raised positions through rotation imparted to sprockets 39 by the operation of the motor unit 40.

As stated, the purpose of the mechanism 6 is to elevate standing pins remaining on an alley bed, as, for instance, after the rolling of the first ball of a frame, and to restore such pins to the same positions which they occupied on the alley when first engaged by the pin-resetting mechanism. When the pins are so gripped and elevated, the sweep mechanism 15 functions to remove fallen pins from the alley, and thereafter the elevated pins are lowered and re-deposited on the alley surface so that they may form the target for the second ball of the bowling frame.

This pin-resetting mechanism forms the subject matter of my aforesaid Patent No. 2,530,385. However, the same may be described briefly as comprising a plurality of heads 41 which are slidably mounted for limited movement in guides 42 forming a part of the frame Z, the latter carrying ten of the heads 41. When the frame Z descends, the heads 41 will be engaged with the upper ends of bowling pins which remain standing on the alley, checking further descent of the heads in unison with the frame Z. This action results in causing the closure of one or more electric switches, carried by the frame Z and hereinafter more fully described, for the purpose of admitting of the flow of a fluid under pressure into one or more of a plurality of cylinders 43 carried by or supported in connection with the frame Z.

In each of the cylinders 43, there is mounted a piston 44 having a depending piston rod 45. Each of these piston rods is connected with a cross member 46 to the ends of which are pivotally united, as at 47, rocker arms 48. These arms for each of the heads 41, are rigidly connected, as at 49, with gripper arms 50, the lower ends of the latter being provided with rollers 51 movable in fixed guides 52 forming a part of the frame Z. Further, the arms 50 carry at their lower ends transverse rods 53.

In the operation of this pin raising and lowering mechanism, when the frame Z thereof descends, and one or more of the heads 41 contacts with a standing bowling pin, the further descent of the frame Z effects operation of the switch means, hereinafter described, associated with the pin-engaged head, causing the flow of fluid under pressure into the associated cylinder or cylinders 43. When fluid is so admitted into a cylinder 43, the piston 44 therein is forced upwardly, thereby rocking the arms 50 about their fulcrums 49 until one of the rods 53 of said arms engages with a standing pin. If a pin should not occupy its initial position on the alley, as may happen as a result of lateral shifting of a standing pin after the rolling of a first ball in a given bowling frame, the position of the actuated cylinder 43 shifts with respect to the vertical axis of the pin-engaged head 41, until the axis of the cylinder is aligned with the vertical axis of the standing bowling pin.

By this means, the standing pin is gripped in exactly the position which it occupies when it is first engaged by one of the heads 41. After being so gripped, the standing pin or pins is elevated by the raising of the frame Z and thereby removed from contact with the alley surface. Following the functioning of the sweep mechanism 15, the frame Z is again lowered, re-depositing the gripped pin or pins on the alley surface in the same position as when it was first engaged. The pistons 44 are then operated to effect release of the re-deposited pin or pins, as will be presently described.

The frame Z carries at the bottom thereof a movable safety frame 54. This frame is located below the heads 41, so that if during the descent of the frame Z, a pin should be standing in a position where it would not contact one of the heads, the frame 54 would be engaged by such a standing pin and moved to a position operating a limit switch, hereinafter described, to arrest further descent of the frame automatically.

The sweep mechanism 15 comprises carriages 55 having rollers 56 which are movable in guides 57 forming a part of the frame structure F. The latter at its forward end is formed with vertically upstanding members 58 in which the guides 57 are continued, and in which guides the carriages 55 are normally positioned, the upstanding members 58 being united by a transversely extending and horizontally disposed frame bar 59. Mounted on this frame bar is a reversible electric motor 60, which drives a pair of aligned shafts 61, the ends of the latter being equipped with sprockets 62 around which chains 63, connected with the carriages 55, are passed. By means of automatic switch controls, hereinafter defined, the motor 60 is energized to impart movement to the carriages 55 in either direction along the guides 57. Pivotally connected with the carriages are arms 64 which are joined with a sweeping panel 65. It will be seen that during movement of the carriages along the horizontal portions of the guides 57, any knocked-down or standing pins disposed on the alley will be engaged by said panel and forced into the pit 5. During such sweeping movement of the panel, the pins gripped by the raising and lowering mechanism will occupy positions above the upper edge of the panel, so that interference with the latter will be avoided.

To provide for the controlled introduction and removal of a fluid under pressure into and from the cylinders of the fluid motors, shown at 10, 24 and 40, use is made of a valved fluid-supplying means embodying the working tank 66 in which a suitable quantity of a liquid is maintained at a given level. Leading from the tank 66 is an outlet pipe 67 which extends to a pump 68 driven by an electric motor 69. A pipe 70 extends from the outlet of said pump to a pressure release valve 71 which is spring loaded to maintain a definite fluid pressure in a pipe line 72. When this pressure is exceeded, the valve 71 opens to return the fluid to the tank 66. The pipe line 72 leads to a plurality of solenoid-actuated valves shown at S3, S5, S9 and S11, and since these valves are identical in construction, a description of one will suffice for all.

Each of these valves includes a casing 77, as shown in Fig. 21. Formed in the casing 77 is an open-ended chamber 78 in which is slidably mounted a balanced type spool valve member 79. Entering the center of the chamber 78 is a passage 80 formed in a partition 81. Communicating with the passage is a pipe line 82 forming a branch of the main fluid supply line 72. Communicating with one end of the chamber 78 on the opposite side of the latter, as regards the passage 80, is a second passage 83. A pipe line 84 is joined with this passage and has arranged therein a check valve 85, the pipe line extending to one side, for example, of the cylinder of the fluid motor unit 24.

The spool valve member 79 of each of the solenoid valves S3, S5, S9 and S11 is formed with a stem 86 which is collared, as at 87, to form a seat for one end of a coil spring 88, the other end of the spring being engaged with a stationary seat forming a part of the casing 77. The stem 86 terminates in a solenoid core 89 which is arranged in the field winding 90 of one of said solenoid valves, so that when the field winding is energized, the core 89 will be reciprocated, moving the valve member against the resistance of the spring 88.

When the field magnet is deenergized, the valve member 79 responds to the action of the spring 88 to maintain the valve member in a position providing for the flow of fluid under pressure from the pipe line 82, through the passage 80, thence around the valve member between the heads 91 thereof and through the passage 83 into the pipe line 84, thence past the check valve 85 and into the cylinder, for instance, of the fluid motor unit 24. This operation maintains the piston in said fluid motor unit in a position elevating the frame Y, or in the case of the fluid motor unit 40, the frame Z, so that normally the fluid pressure, unless otherwise regulated, maintains these frames in an elevated position. When it is desired to lower the frames, the solenoid coils 90 are energized and, simultaneously therewith, the coils 92 of the solenoids 93 of the check valves 85.

As a result of the energization of any one of the coils 90, the valve member 79, associated therewith, is moved against the resistance of its spring 88 to a position in which a pipe line 94, arranged at the end of one of the cylinders 24 and 40, opposite to the pipe line 84 thereof, is in communication with the passage 80, and fluid communication between the passages 80 and 83 is interrupted by the valve member 79. Simultaneously, the check valve is opened. The frame Y or Z then descends in a controlled manner, whereby to deposit the pins carried thereby on the alley surface or to grip pins positioned on said surface. During this descent, the piston of each of the cylinders 24 and 40 moves toward the end of the cylinder connected with the line 84, and the fluid displaced by the piston is exhausted through the line 84, to the exhaust chamber 96, and outwardly through the exhaust passage 97 of the valve. From the passage 97, the fluid passes through a branch 98 to a fluid return line 99 which extends back to the tank 66.

Having thus described the essential mechanical construction and operation of the several co-acting mechanisms involved in my improved automatic bowling apparatus, reference is now to be had to the automatic electrical controls for governing the operation of such mechanisms in proper sequential order.

The sequence of operation of the pin-handling units is regulated by a controller drum 100, which is rotatably mounted on a base panel 101 located at the rear of the bowling alley. The drum is formed to provide, as shown, eighteen working positions and is ratcheted from position to position by the use of the solenoid shown at S26. The armature of this solenoid is pivotally connected with a link 102, the opposite end of the link being pivotally united with the arm 103 of a swinging detent 104, which is loosely mounted for rocking movement on the drum shaft 105. An arm 106 of the detent is connected with one end of a coil spring 107, while the opposite end of said spring is connected as at 108 with the field frame of the solenoid S26, the spring serving to maintain the arm 103 of the detent in engagement with an adjustable stop in the form of a set screw 103'. The arm 106 of the detent carries a turnable stud shaft 109 to which is fixed a pawl 110, the outer end of the pawl having engagement with the teeth of a ratchet wheel 111 secured to said drum. The stud shaft carries a pin 112 which is connected with one end of a light coil spring 113, the opposite end of this spring being joined with the arm 106 of the detent so that the pawl is positively maintained in engagement with the teeth of the ratchet wheel. It will be evident that when the solenoid S26 is energized, the detent will be rocked a sufficient distance from its normal position of engagement with the set screw 103' to rotate the drum a distance equal to that between successive teeth.

To prevent excessive rotation of the drum when responding to the excitation of its actuating solenoid, the detent is formed with a third arm indicated at 114. As shown in Fig. 34, when the solenoid is energized, the arm 114 is moved to a position free from a pivoted latch 115, which is mounted on the base panel of the drum. This latch is pressed by a spring 116 so that its free end, when out of contact with the detent, will engage with the stop teeth of a second ratchet wheel 111' secured to said drum to limit the rotation of the drum. When the detent returns to its normal position as in Fig. 33, the arm 114 engages the latch and holds the same out of engagement with the ratchet teeth of wheel 111'.

The periphery of the drum is provided at spaced intervals with outwardly projecting switch-actuating cams 117. These cams are positioned for engagement with rollers 118 provided on the upper ends of a plurality of pivotally mounted actuating arms 119 of a group of switches DS1 to DS14, inclusive, DS20, DS21, DS1F, DS2F, DS3F, DS4F, DS6F, DS7F, DS8F and DSP14, hereinafter more fully defined. These switches, as shown in Figures 31 and 32, are mounted on the base panel 101 in longitudinal rows disposed on opposite sides of the cylinder or drum 100. Through the step by step rotation of the drum, the cams 117, being properly disposed in various positions on the periphery of the drum, close or open the necessary electric switches to produce the desired sequence of operation of the mechanisms described.

Figure 36:
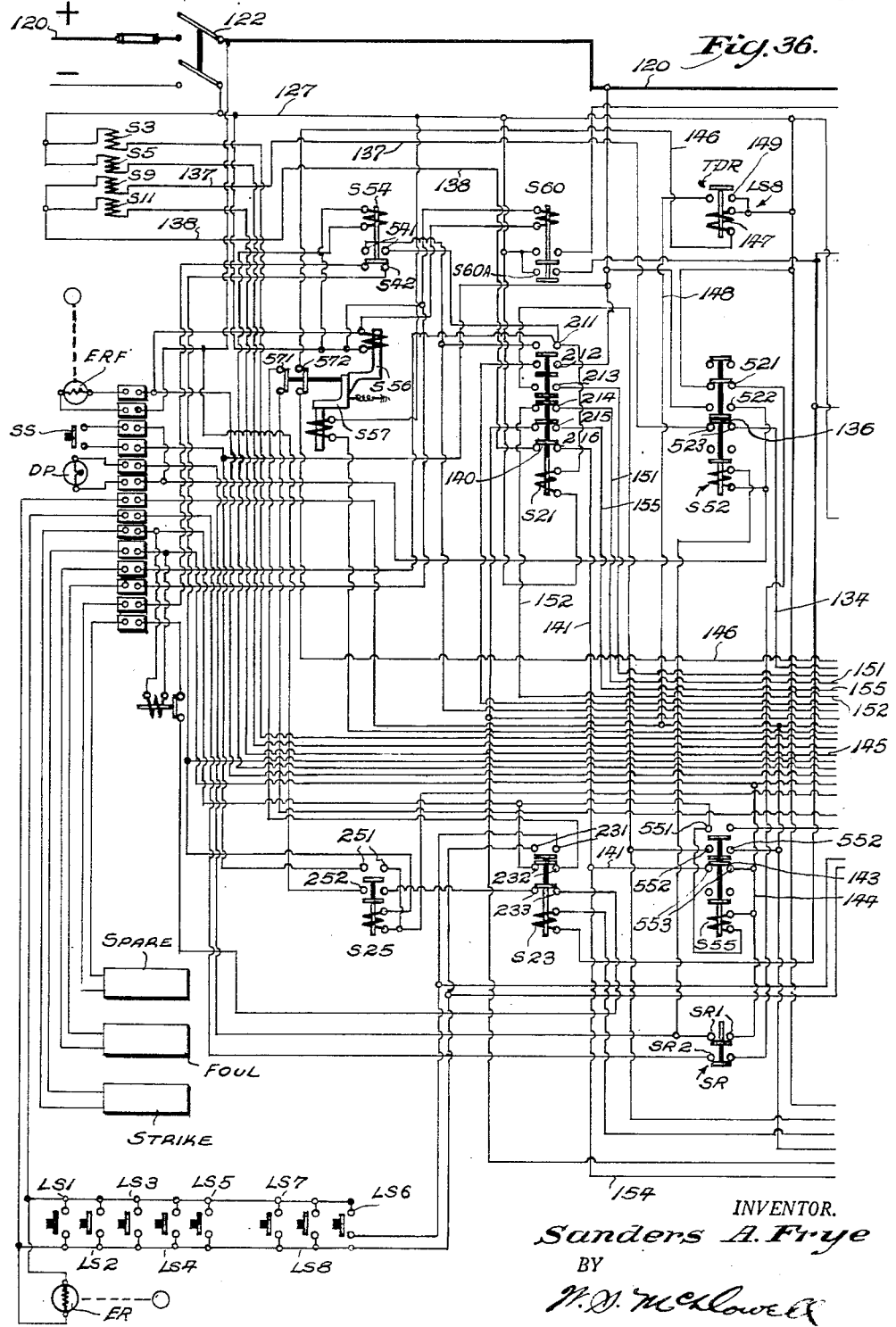
Fig. 36 is a diagrammatic view of a pair of the electrical circuits used in my improved control system.
Figure 37:
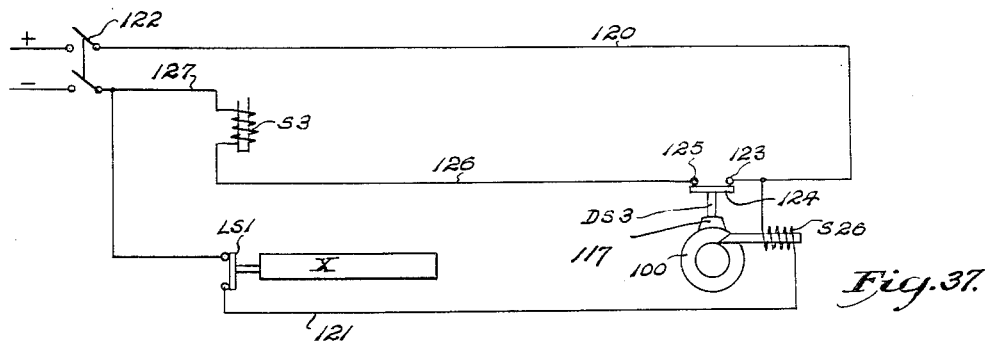
Figure 38:
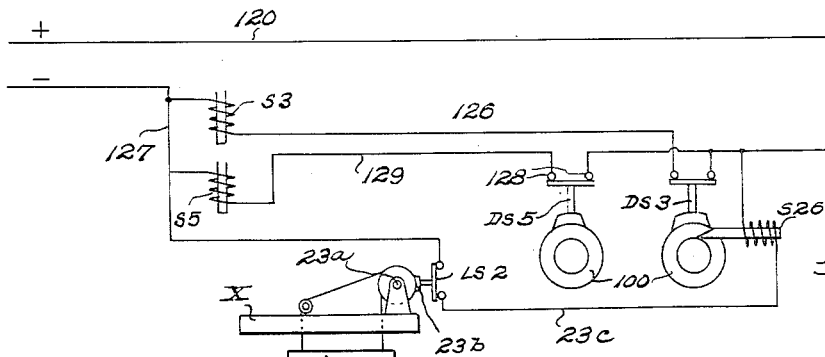

With regard to the circuits:

Figs. 36 and 36a of the drawing disclose the complete circuit system including switches, solenoids, relays, motors and the like. However, owing to the relative complexity of the complete circuit diagram, the same, for convenience in understanding, has been broken down in Figs. 37 to 56, inclusive, in which the circuits for each operational position of the drum 100 have been separately illustrated. Thus in Fig. 37, there has been disclosed the circuits which are in operation when the drum occupies its initial position, hereinafter referred to as position 1. In this figure, current enters from a suitable source of supply by way of the conductor 120, through a control switch 122 and continues to the terminal 123 of the drum switch DS3. In this position of the drum, one of the cams 117 thereof engages the switch DS3 to maintain its contactor 124 in engagement with the spaced terminals 123 and 125, thus closing the circuit through the switch DS3. From the terminal 125, a conductor 126 leads to the field windings of the solenoid S3, causing the latter to be energized, as well as the windings of the solenoid actuated check valve 85 connected therewith, the current then passing to the return conductor 127, the switch 122 and back to the source of current supply. The energization of the solenoid valve S3 introduces fluid under pressure into the cylinder of the fluid motor 10, which causes the frame X to move forwardly on the frame structure F. As it moves forwardly, the frame X engages momentarily and then releases the limit switch indicated at LS1 in Fig. 25 which closes a circuit 121 energizing the solenoid S26 momentarily, and thus rotating the drum from position 1 to position 2.

In the next position of the drum 100 (position 2), the switch DS3 remains closed, and through said rotation of the drum, another cam thereon closes the switch DS5, causing the energization of the solenoid S5 in addition to the solenoid S3. When the switch DS5 is thus actuated, its spaced terminals 128 are bridged, so that current will flow from the lead-in conductor 120 across the terminals of switch DS5 and thence by way of a conductor 129 to the windings of the field coil of solenoid S5, then passing to the return conductor 127. As a result of the energization of solenoid S5, the frame Y of the pin-setting mechanism is caused to lower and place its pins in bowling position on the pin-receiving area of the alley. When the solenoid S5 is deenergized, the frame Y returns under hydraulic pressure to its elevated or "up" position adjacent to the frame X. When the frame Y is being lowered, the shaft 23a is revolved, causing a contact arm 23b thereon to engage momentarily and then release the limit switch LS2 which, through the circuit 23c, momentarily energizes the coil of solenoid S26 to produce movement of the drum from position 2 to position 3.

Figure 39:
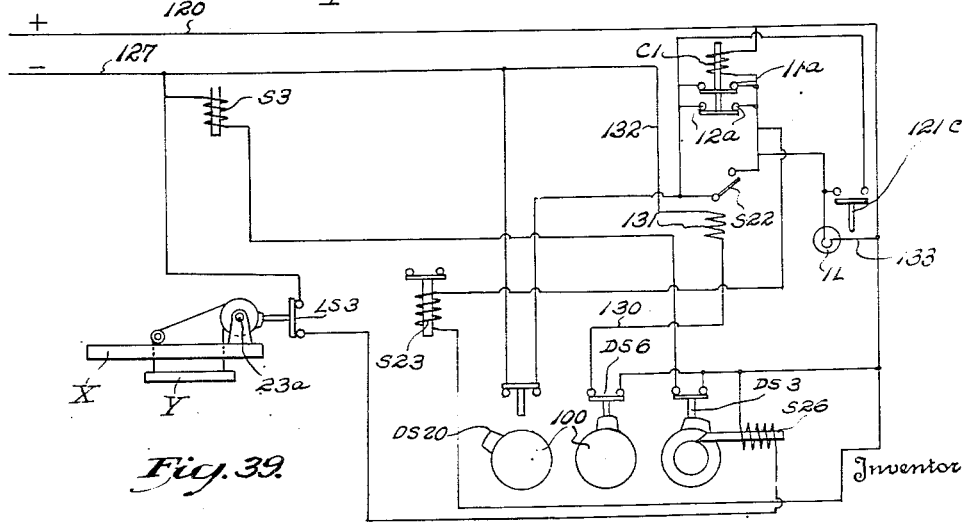

The circuits which are energized in the third position of the controller drum have been illustrated in Fig. 39. It is desirable to use in connection with my improved bowling system an illuminated panel or board disclosing the pins which are standing on the alley. Thus when the frame Y returns to its "up" position, leaving the pins standing in grouped order on the alley, the pin-denoting lamps (ten in number) are illuminated, disclosing visually to the players the presence of ten pins on the alley, the incandescent lamps, employed in effecting the illumination of such a board or panel, being indicated by the reference characters 1L to 10L, inclusive. In position 3, the switch DS3 remains closed, thereby continuing the excitation of the solenoid S3. Also, the switch DS6 is closed, providing for current flow from the lead-in conductor 120, through the terminals of switch DS6 and thence by way of the conductor 130 to the field coil 131 of a relay shown at S22. This relay comprises a ten-pole single throw relay device which, when closed by the switch DS6, closes all relays in the group indicated at C1 to C10, inclusive, and lights incandescent lamps 1L to 10L, inclusive, which are in parallel respectively with the coils of the relays C1 to C10. From the field coil 131, a conductor 132 extends to the return conductor 127.

In illuminating the lamps 1L to 10L, inclusive, current passes from the lead-in conductor 120 to a conductor 133. This conductor terminates in a multiplicity of branches so that the incandescent lamps are wired in parallel.

Indicated by the reference characters 121c to 130c, inclusive, Fig. 36a, are ten single-pole, single-throw switches, which are distributed about the frame Z of the raising and lowering mechanism. These switches are so disposed that they are actuated individually by the ten pin-engaging plates or heads 41 of the frame Z when the latter is lowered over pins standing on the alley after a ball has been rolled. Each plate or head 41, when displaced upward in the frame Z, is held against movement through engagement with a pin standing on the alley, and closes by mechanical pressure its respective switch 121c to 130c. These latter switches, when closed, complete energizing circuits to corresponding coils in the relay group, indicated at C1 to C10, inclusive, in Fig. 36a.

On the relays C1 to C10, contacts 11a, 21a, 31a, 41a, 51a, 61a, 71a, 81a, 91a and 101a are holding contacts, which hold their respective coil circuits closed after the opening of the switches 121c to 130c when the frame Z rises. Also, on these relays C1 to C10, the contacts indicated at 12a, 22a, 32a, 42a, 52a, 62a, 72a, 82a, 92a and 102a are wired in parallel. The closure of any one of this 12a to 102a group of contacts energizes the relay S23 which, when closed, prevents a strike sequence operation of drum cam switch 100. The unused contacts on relays C1 to C10, shown in Fig. 36a, may be employed, if desired, for use in connection with an automatic score-counting apparatus, not shown. The solenoid S26 is energized by a circuit in which the switch LS3 furnishes the control, this switch being actuated by the Y frame shaft 23a.

Figure 40:
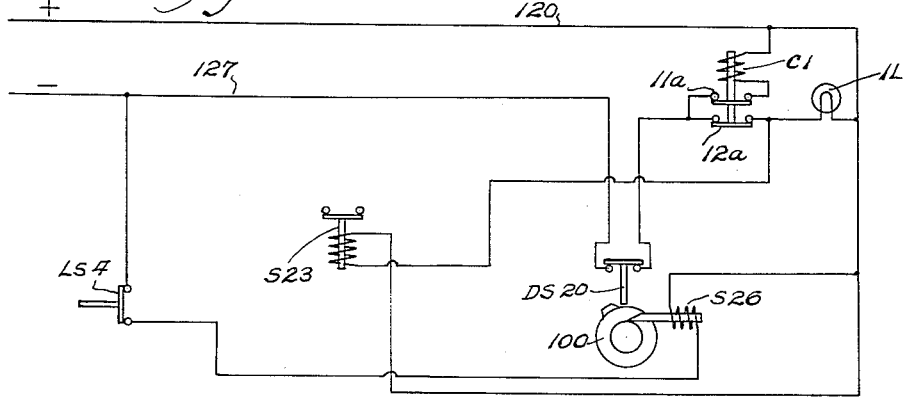

In position 4 of the controller drum, disclosed in Fig. 40, switches DS3 and DS6 are open and DS20 remains closed. In this position, the coil of the relay S22 is de-energized, but the lamps 1L to 10L, inclusive, remain illuminated or energized, since all of the ten coils of the relays C1 to C10, inclusive, remain energized through the employment of the holding contacts 11a, 21a, 31a, 41a, 51a, 61a, 71a, 81a, 91a and 101a.

Figure 41:
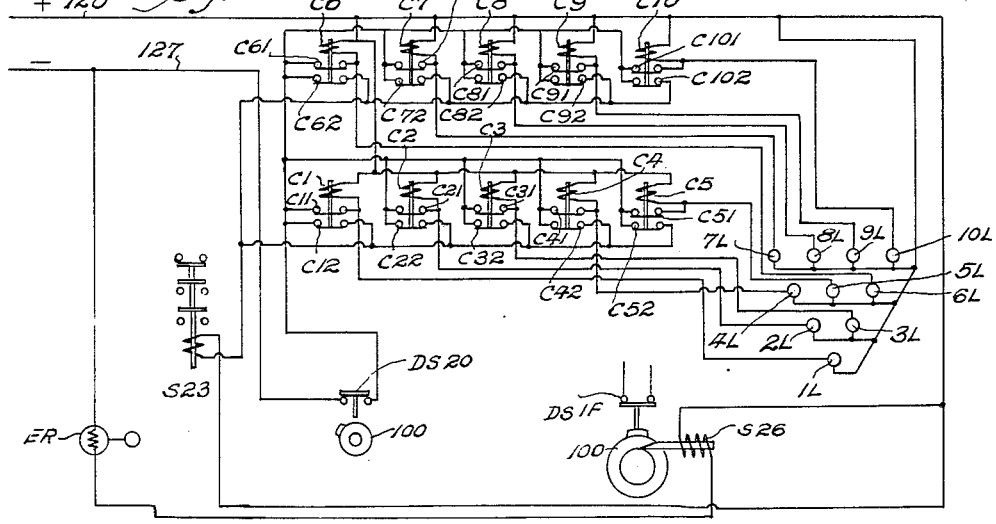

At this stage, through actuation of the switch LS4 (see Fig. 25), by the return movement of the X frame, the drum is advanced to position 5, in which the circuits disclosed in Fig. 41 are utilized. Position 5 may be termed the waiting position, in that the apparatus is ready for the delivery or rolling of the first ball into the group of standing pins. As shown in Fig. 41, the lamps 1L to 10L remain energized through the operation of the relays' respective holding contacts, and the switch DS20 remains closed to provide for the return flow of current from the relays C1 to C10 to the return conductor 127. Also, the coil of the solenoid S23 remains energized and the switch DS1F of the controller drum is closed in order to be in position to detect a foul, if one is committed by the bowler, which operation is hereinafter described in connection with Figs. 55 and 56. The actuation of the electronic relay ER by the rolled bowling ball intercepting a light beam, effects the energization of the solenoid S26, thus moving the drum to position 6.

Figure 42:
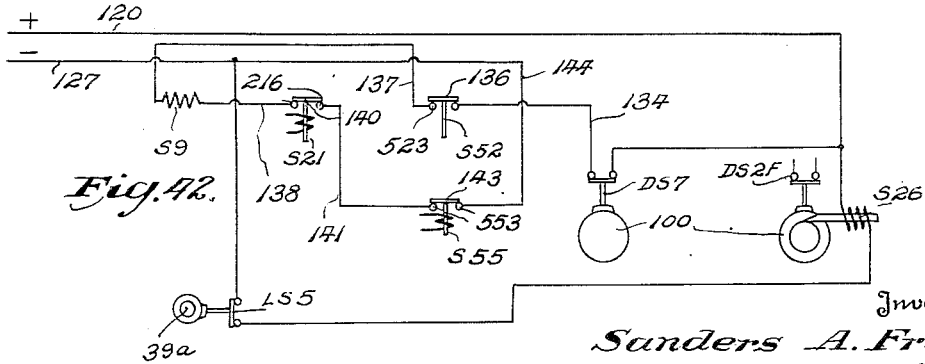

In position 6 of the controller drum, shown in Fig. 42, the drum switch DS7 is closed and also the switch DS2F. The closing of the switch DS7 provides for transmission of current from the lead-in conductor 120 through switch DS7 and thence by a conductor 134 to the terminals 523 of the solenoid switch or relay S52, these terminals being bridged by the pole bar 136 of the armature of said relay switch. A conductor 137 extends from the terminals 523 to the solenoid S9 of the hydraulic control valve, energizing said solenoid for the operation of the Z-frame valve. From the coil of the solenoid S9, a conductor 138 leads to the terminals 216 of the solenoid relay S21 which is normally deenergized, the terminals being bridged by the pole bar 140. From the terminals 216, current is conducted by way of the lead 141 to a pair of spaced terminals 553 provided on the solenoid relay S55, these terminals being bridged by the pole bar 143 of said solenoid relay S55 and from the contacts 553 the current is carried by the lead 144 to the return conductor 127. As a result of these functions, the frame Z of the pick-up mechanism is lowered and, through the rotation of its shaft 39a, the limit switch LS5 closes a circuit in which the solenoid S26 is positioned, thus advancing the drum from position 6 to position 7.

Figure 43:
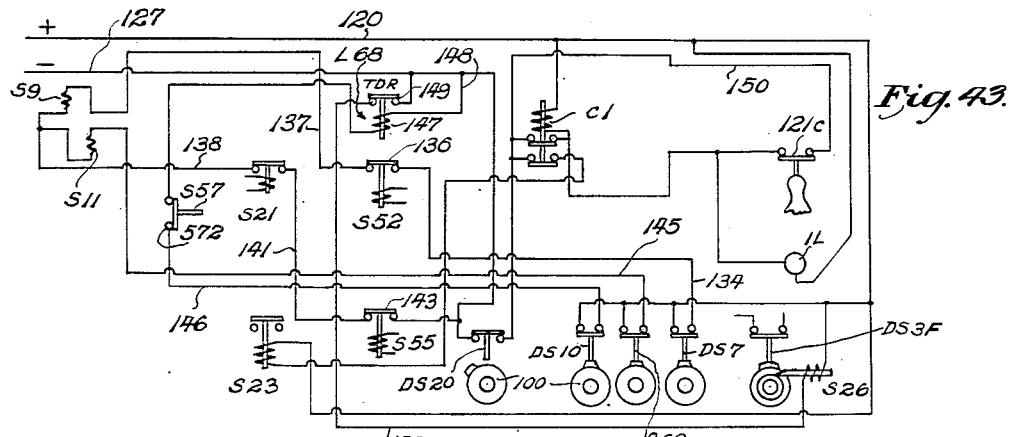
Figure 44:
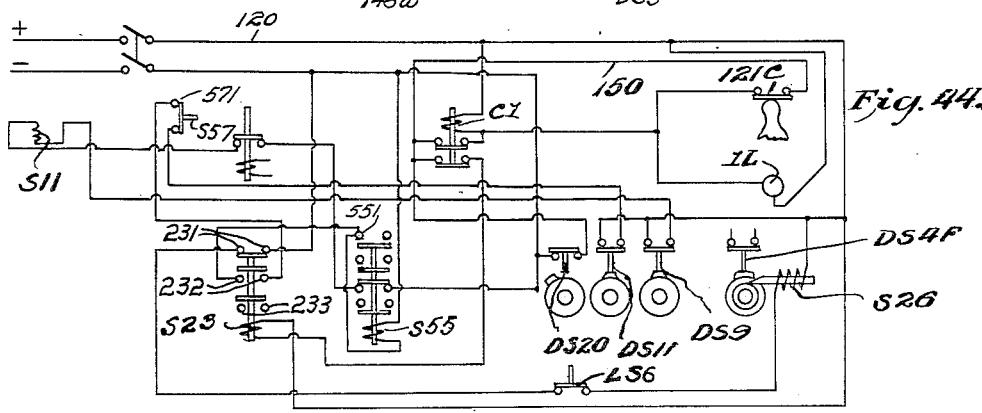
Figure 45:
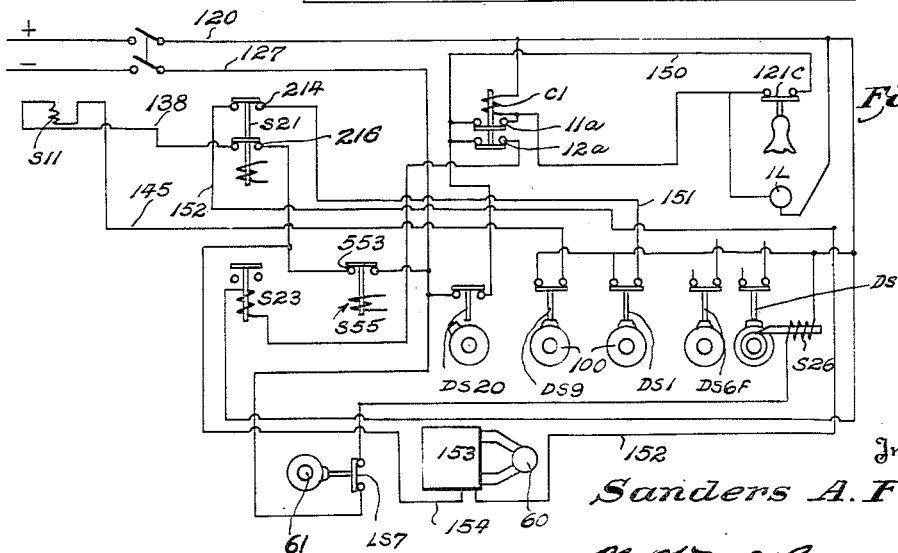

In position 7, the controls are such as to cause the clamps of the frame Z to engage and grip any bowling pins remaining standing on the alley following the rolling of the first ball, and providing that a "foul," or "strike" has not been executed. The circuits involved in this position of the controller drum under the conditions specified involve the solenoids S9, S11, S21, S23, S52 and S55, as shown in Fig. 43. When the solenoid valve S9 is energized, as in Figs. 42 and 43, the frame Z is lowered over the pin positions and when it is deenergized, the said frame Z returns to its "up" position. When solenoid valve S11 is energized, any standing pins are gripped by their respective clamps on the frame Z, and when solenoid S11 is deenergized, the clamps are released.

Thus, in position 7, the cams on the drum close the switches indicated at DS7, DS9, DS10, and DS3F, and DS20 is also in a closed condition. At this stage of the description, it will be assumed that no "foul" was committed by the player, hence the circuits associated with the switch DS3F will not be described at this time. However, the switch DS3F is closed in order that its circuits would have been operative to detect the "foul" and vary the operation of the system if such a "foul" had occurred.

In energizing the solenoid S9, which actuates the fluid valve controlling the lowering and raising of the frame Z, the circuit is the same as in position 6. However, in order to operate the clamping jaws of the frame Z so that the standing pins may be gripped and elevated, the switch DS9 of the drum is closed so as to transmit current by way of the conductor 145 to the field winding of the solenoid S11, the return being made through relays S21 and S55 in common with that of the solenoid S9. To provide time for the clamping of the standing pins, I employ a time delay relay indicated at TDR, which is actuated by the switch DS10 on the drum assembly. When the contacts of the switch DS10 are closed, current passes by way of the conductor 146 through the contacts 572 of the relay S57 and thence to the field winding 147 of the relay TDR, a conductor 148 leading from the field winding 147 to the return conductor 127. The field coil of the solenoid S26 is provided with a return conductor 148a, which leads to the contacts 149 of relay TDR and from these contacts to the return line 127, so that when relay TDR is energized, the drum is rotated from position 7 to position 8.

It will be noted that in position 7, the return switch DS20 is closed so that the pin or pins standing on the alley may be denoted by the indicating lamps 1L to 10L. In Fig. 43, one of the switches 121c has been shown as engaged with the head of a standing pin. Such engagement results in completing the circuit of the lamp 1L by way of the conductor 150 which leads to the return conductor 127 through the contacts of drum switch DS20.

In position 8 of the drum, the solenoid S9 is deenergized so that the frame Z ascends to its elevated position, lifting the bowling pins gripped thereby from the alley surface so that the sweep mechanism may function to remove fallen pins. Also, the time delay relay TDR is deenergized but the solenoid S11 is maintained in its energized condition in order to cause the pin clamps of the frame Z to remain set. In this position of the drum (8), the switches DS4F, DS9, DS11 and DS20 (see Fig. 44) are closed, and the field winding of the solenoid S26 is momentarily energized by the closure of the limit switch LS6, moving the drum from position 8 to position 9, switch LS6 being closed by movement of the frame Z to its elevated position.

In this latter position, the driving motor for the sweep mechanism is actuated and debris pins, if any, are swept from the alley into the pit. The solenoid S11 which governs the pin clamps remains energized. In energizing the motor of the sweeping mechanism, the drum switch DS1 (see Fig. 45) is closed, transmitting current by way of the conductor 151 to the contacts 214 of the relay S21. From these contacts, the conductor 152 leads to the reversing switch 153 of the sweep motor 60, causing the latter to actuate the sweep mechanism in a direction moving the panel 65 rearwardly of the alley to clear fallen pins therefrom. From the switch 153, a conductor 154 leads to the contacts 553 of the relay S55 and return is then made to the negative line of the circuit. The closure of the limit switch LS7 (see Fig. 45) actuated by the shaft 61 shown in Fig. 27, advances the drum from position 9 to position 10. It will be understood that the limit switches are of the type which normally are but momentarily closed. However, the duration of this period of closure is sufficient to energize the coil of the solenoid S26 to move the drum from one working position to another.

During a normal bowling sequence, that is, when "fouls," "strikes" or "spares" are not involved, the drum 100, when in position 10, operates switches to reverse the motor 60 with respect to its direction of rotation when the drum occupies position 9, so that the panel 65 may be moved forwardly of the alley and returned to its normal elevated position thereabove. To accomplish this, the drum closes switch DS2 when in position 10 so that current may flow from the positive line 120, through switch DS2 and thence by way of the conductor 155 to the terminals 215 of relay S21. After passing through these terminals, the current is advanced by way of conductor 156 to the terminals of the reversing switch 153 of the sweep motor 60 and returned to the negative side of the circuit by way of the return conductor 127 which leads through the contacts 553 of the relay S55.

Figure 46:
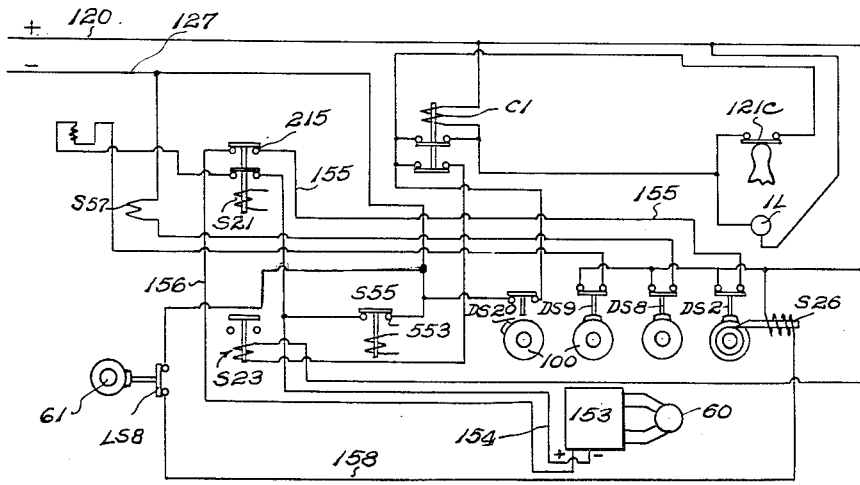
Figure 47:
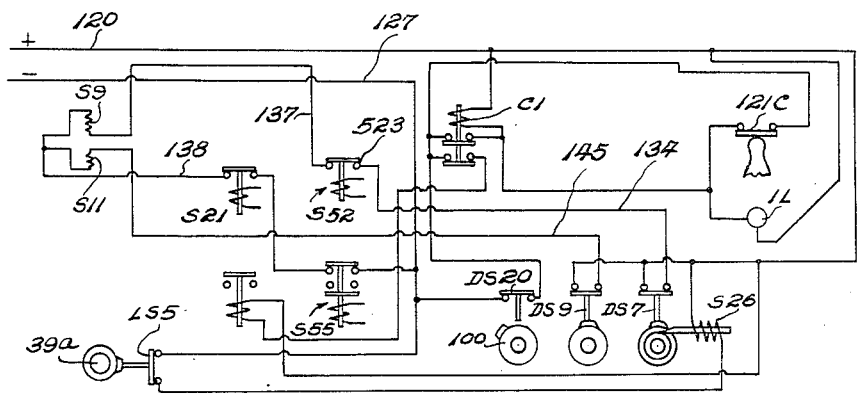

Upon predetermined movement of the motor shaft 61 as it moves in a direction to return the sweep to its inactive position, the limit switch LS8 is actuated to close the circuit indicated at 158 in Fig. 46 in which the solenoid S26 is positioned, whereby to ratchet the drum 100 from position 10 to position 11. While the pins are held in the frame Z above the alley surface, the switches 121c to 130c, in contact with the pins gripped in the frame Z, remain closed. The corresponding lamps 1L to 10L on the panel or board will remain illuminated. This is true in drum positions 7, 8, 9, 10 and 11.

The limit switches LS7 and LS8, as shown in Fig. 27, are actuated by threading one of the shafts 61 of the motor 60, as at 159, to receive the internally threaded hub of a slidable switch actuator 160. It will be seen that as the shaft 61 rotates first in one direction and then in the other, the actuator 160 will successively strike the throw arm 161 of the limit switch LS7 near the end of the sweeping motion and the throw arm 161a of limit switch LS8 so as to energize closing circuits for the solenoid S26.

Continuing the same bowling sequence, when the drum occupies position 11, the frame Z is lowered by the actuation of the solenoid S9 to deposit the pins gripped by the frame Z on the alley in precisely the same positions as when the pins were first gripped by the jaws of the frame Z. As in position 6, the drum actuates switch DS7 (see Fig. 47), transmitting current by way of the conductor 134, through contacts 523 of relay S52 and conductor 137 to solenoid S9, the return being through the line 138 and relays S21 and S55 to the return line 127. Similarly, the switch DS9 closes the circuit to the solenoid S11 and return is made through relays S21 and S55, as in the case of the solenoid S9. By this operation, the frame Z is lowered and the pins gripped thereby deposited on the alley surface.

Figure 48:
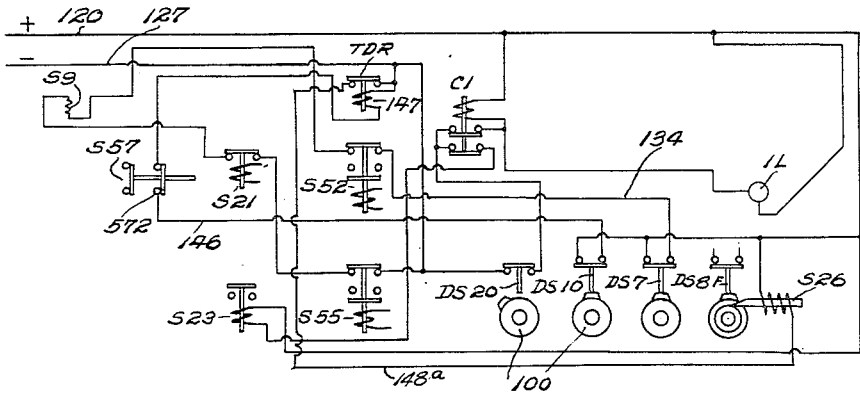

The limit switch LS5 cooperative with the shaft 39a closes the circuit to the drum-ratcheting solenoid S26 to move the drum to position 12. In position 12, the drum, as indicated in Fig. 48, operates switches DS7, DS10 and DS8F. The switch DS9 is open to deenergize solenoid S11 in order to release the pins gripped by the frame Z. The solenoid S9 remains energized by the operation of switch DS7, in order to keep the frame Z in its lowered position during the release of the pins. Likewise, the lamp or lamps 1L to 10L remain illuminated to indicate the pins which remain standing on the alley. In position 12, the time delay relay TDR is energized through the switch DS10 in order to give sufficient time for the full release of the pins from the frame Z. This relay then closes the circuit which energizes the solenoid S26 through the conductor 148a, advancing the drum from position 12 to position 13.

Figure 49:
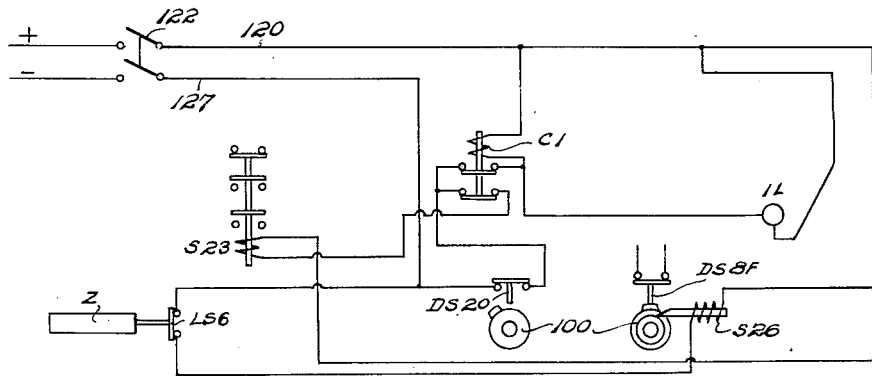
Figure 50:
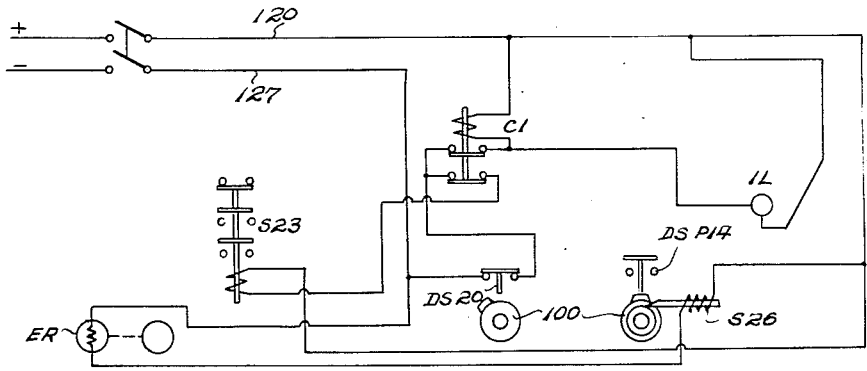

As indicated in Fig. 49, when the drum is in position 13, the solenoids S9 and S11 are deenergized and are out of the circuit. This allows the frame Z to ascend to its normal elevated position. When the frame reaches its elevated position, the limit switch LS6, as shown in Fig. 49, is actuated to energize the solenoid S26, thereby moving the drum to position 14.

Figure 51:
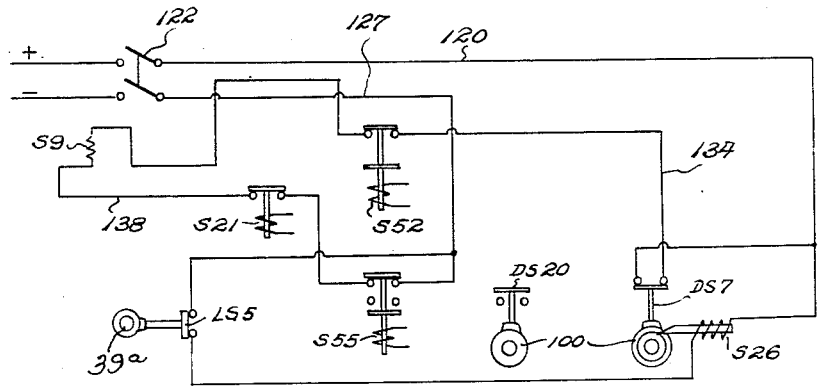
Figure 52:
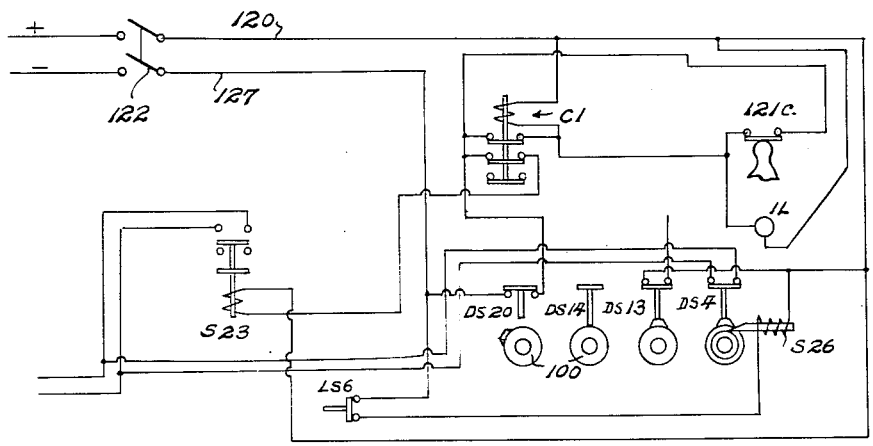

In position 14, the drum is at rest, awaiting the rolling of the second ball of the bowling frame. The second ball of the frame interrupts the beam of electronic relay ER a short distance ahead of the standing pin or pins. After a few seconds' time delay, the electronic relay responds to move the drum from position 14 to position 15. When in this latter position, particularly when an automatic score-counting mechanism is used, the frame Z is lowered to count the standing pins, this being accomplished by energizing the solenoid S9 of the control valve regulating the descent of the frame Z. During the descent of the frame Z, the limit switch LS5, as shown in Fig. 51, is actuated by the operation of the shaft 39a, to energize the solenoid S26 to ratchet the drum from position 15 to position 16. Likewise, in position 16, when automatic score counting mechanism is used, the solenoid S9 is deenergized to cause the frame Z to rise. When the frame Z is again elevated, the limit switch LS5 is actuated to move the drum to position 17.

Figure 53:
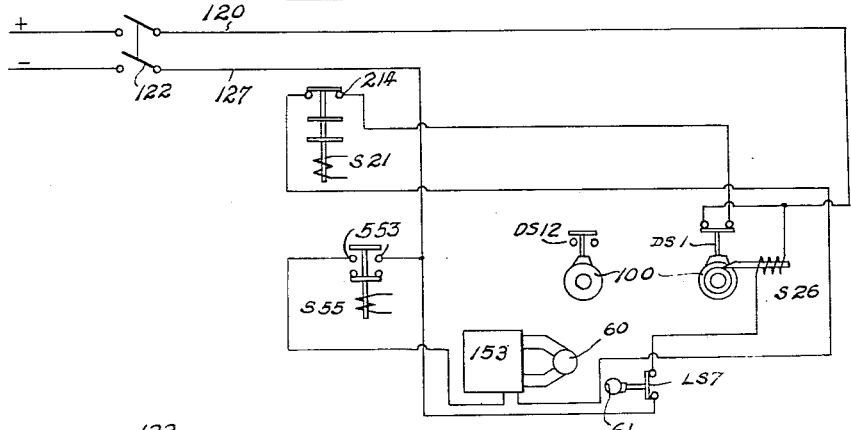
Figure 54:
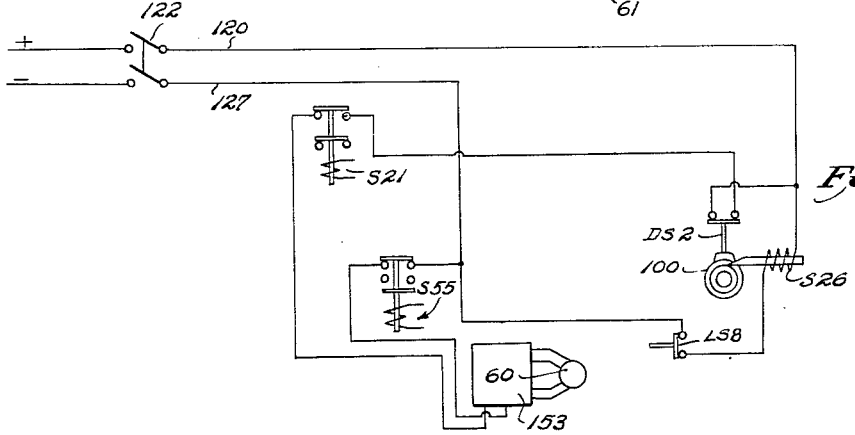

In position 17, the sweep motor 60 is energized through the closure of drum switch DS1 as in Fig. 53, current being transmitted through the spaced contacts 214 of relay S21 and thence to the motor switch 153, return being made to the energy source by the relay S55 through the contacts 553 thereof. The limit switch LS7 is closed by the shaft actuator 160 and the drum is advanced to position 18. In this latter position, the sweep motor 60 is reversed to bring the sweep panel back to its normal elevated position. When this position is reached, the limit switch LS8 of Fig. 54 is actuated to move the drum to position 1, where the cycle may be repeated.

It will be noted that as long as switches 121c to 130c find pins standing after the first ball of a frame, there will be at least one relay C1 to C10 closed, and hence at least one contact thereof will be closed. Therefore, relay S23 will be energized whenever there is no strike condition, since the field winding of relay S23 is in parallel with contacts 12a to 102a of the C1 to C10 relays, and the contacts 232 of relay S23 will be open to prevent a strike sequence when cam switch DS11 closes in position 8 of the drum to test the circuit for the purpose of discovering the strike, if one is made. If in position 8, the drum-actuated cam switch DS11 finds a circuit through contacts 232 of the relay S23 (because a strike has left all contacts 12a to 102a open), then relay S55 will be energized through contacts 232 of S23 and 571 of S57, and a strike cycle will occur. The opening of contacts 231 of relay S23, which are in series with the limit switch LS6, prevents a surplus of impulses by relay S26 when a strike occurs. Contacts 233 of relay S23 remain closed in case of a "spare," as will be described later.

When cam switch DS11 closes in position 8 to test for a "strike" and finds contacts 232 of relay S23 closed, it energizes the field of relay S55 through contacts 571 of S57. The contacts 551 of relay S55 bridge the contacts of cam switch DS11 and hold relay S55 closed after the drum 100 moves away from its position 8. Contacts 552 close the circuit through contacts 261 of the solenoid S26 and cause repeating action of the solenoid S26 until cam switch DS12 opens in drum position 17, at which time relay S55 is deenergized. During the rapid ratcheting of the drum from position 8 to position 17, and while S55 is energized, the contacts 553 are open thereby opening the circuits of the solenoids S9 and S11 and the sweep motor 60 to prevent operation thereof. The unused contacts shown on the solenoid S55 are adapted for use if a score counter is added.

When cam switch DS13 closes in drum position 16, relay S25 will be energized through closed DS14 to close the contacts of the relay. If at that time, the relay S23 is deenergized because a "spare" has been achieved, there will be a circuit through the contacts 233 of relay S23, the contacts 252 of relay S25, the contacts 542 of S54, the "spare" signal lamp and the contacts of DS14, whereby the "spare" signal lamp will be lighted. Contacts 251 of relay S25 are holding contacts, which hold the armature in circuit-closing position after cam switch DS13 opens and until cam switch DS14 opens in position 18.

The solenoid S26 operates the eighteen-toothed ratchet when employed in effecting incremental rotary movement on the part of the drum 100. When a circuit is established through contacts 261 of the solenoid S26, it causes the latter to repeat in its operation until the circuit through contacts 261 is interrupted.

When the electronic relay ERF which guards the "foul" line, observes a "foul," that is, when the bowler in delivering a ball advances beyond a predetermined line at the front of the alley, the said relay ERF sends a signal to the closing coil of the relay S54, see Fig. 55, which causes the "foul" signal lamp to light, indicating the foul. The closing of relay S54 also closes the contacts 541 thereof, which causes relay S21 to close and to be held closed by its contacts 211. The simultaneous opening of the contacts 542 of relay S54 prevents the lighting of the "spare" signal lamp in case the "foul" is committed on the second rolled ball of a frame and the rolled ball clears the alley of all standing pins.

The relay S21 closes when relay S54 closes in response to a "foul" on the first ball of a frame. When relay S21 closes, it isolates cam switches DS1 and DS2 and solenoid-operated valves S9 and S11 by opening contacts 214, 215 and 216, respectively, of said relay S21. This isolation is necessary because an unusual sequence of operation is thereafter required. The circuit through contacts 212 permits cam switch DS7F to re-light all pin lamps 1L to 10L because that circuit is through the field coil of S22, and also permits switch DS2F to start the sweep motor 60 to clear the alley of all pins in drum position 6, as illustrated in Fig. 56. When the alley has been swept and the frame Y is at rest after setting pins for the second ball of the frame, the number of operations passed through is less than if there had been no "foul" committed because it has not been necessary to operate the frame Z and its pin clamps. Therefore, in order to advance the control drum quickly to position 14, which is its normal rest position to await the second ball, cam switch DS8F engages the repeating contacts 261 of solenoid S26 through the closed contacts 213 of relay S21, and the drum advances to its working position 14. In this position, cam switch DSP14 opens the coil circuit of relay S21 and the "foul" cycle is completed.

When the safety plate or frame 54 on the bottom of frame Z strikes an excessively displaced pin as the frame Z descends, the safety switch SS is closed by movement of the frame 54 toward the frame Z, and the relay S52 is energized through a circuit provided by the contacts SR1. Energization of the relay S52 opens the operating circuit of solenoid S9, which, in turn, reverses the valve controlling the lowering and raising of frame Z, thus causing frame Z to rise. After the frame Z rises to its upper position, the contacts 521 of relay S52 being open, prevent the functioning of the limit switch LS6, so that drum 100 is not advanced and the entire machine remains at rest. The contacts 522 of relay S52 hold the associated circuit energizing the coil of S52 closed. Contacts 523 of relay S52 isolate solenoid S9 to prevent repeated lowering of the frame Z.

When the frame Z rises to its "up" position and remains there after striking an excessively displaced pin, the pin must be disposed of by an attendant. This condition is indicated visually by signal lamp DP. After the displaced bowling pin has been removed, the attendant pushes the manual push button switch SR. Contacts SR1 open the coil circuit of the relay S52 and the normal sequence proceeds. Contacts SR2 of switch SR isolate momentarily all of the LS1 to LS8 switches to prevent the switch LS5 closing its circuit again when frame Z descends.

When a "foul" occurs, relay S56 trips open the contacts 571 and 572 of relay S57. The opening of the circuit through contacts 571 prevents the lighting of the "strike" signal lamp. Contacts 572, when opened, prevent the operation of the time-delay relay TDR, which if operated at this time would cause one excess step in the following drum sequence.

The cam switch DS8 energizes the relay S57 in drum position 10 and so restores contacts 571 and 572 to normal circuit-controlling relation after their functions are no longer needed. The time delay relay TDR introduces a delay of the next sequence step on the drum in positions 7 and 12, in order to allow time for the frame Z to grip all pins and release the same. The relay S60 operates on every "foul" and, by the closing of its upper contacts, prevents the opening of the circuit to the C1 to C10 relays by cam switch DS20. Bottom contacts S60A of S60 prevent the indication of a "spare" after a "foul" has been committed when all remaining pins are knocked down by the second ball of the frame, the contacts S60A serving to hold the circuit closed through the field coil of S23.

Fig. 56 illustrates the electrical circuits which control the sweep motor 60 and the illumination of the lamps L1–L10 in response to a foul.

The following tables, numbered 1, 2 and 3, are presented to provide a ready understanding of the operation of the apparatus in the various drum positions.

*Table 1.—No "strike," "spare" or "foul"*

| In Position No. | Drum Cam Operates— | Resulting Operation | Master Drum Moves from Position to Position |
|---|---|---|---|
| 1 | S3 | X Frame forward. Close LS1 | 1–2 |
| 2 | S5 | Y Frame down. Close LS2 | 2–3 |
| 3 | De-energize S5 | Y Frame up. Close LS3 | 3–4 |
| 4 | De-energize S3 | X Frame back. Close LS4 | 4–5 |
| 5 | | Drum at rest awaits first ball of frame. First ball of frame interrupts beam of electronic relay a short distance ahead of pins. After an appropriate time delay of a few seconds the electronic relay moves the drum to position | 6 |
| 6 | S9 | Z Frame down. Close LS5 | 6–7 |
| 7 | S11 / Time delay TDR energized / De-energize TDR | Standing pins clamped. TDR closes | 7–8 |
| 8 | De-energize S9 | Z Frame up. TDR opens. Close LS6 | 8–9 |
| 9 | Sweep driving motor | Debris pins, if any, swept from alley into pit. Close LS7 | 9–10 |
| 10 | Sweep driving motor reversed | Sweep returns to at-rest position. Close LS8 | 10–11 |
| 11 | S9 | Z Frame down. Close LS5 | 11–12 |
| 12 | De-energize S11 / Energize TDR | Clamped pins released / TDR closes | 12–13 |
| 13 | De-energize S9 | Z Frame rises. Close LS6 | 13–14 |
| 14 | | Drum at rest awaits second ball of frame. Second ball of frame interrupts beam of electronic relay a short distance ahead of pins. After a few seconds time delay, the electronic relay moves the drum from | 14–15 |
| 15 | S9 | Z Frame lowers to count if a score counter is provided and closes LS5 | 15–16 |
| 16 | De-energize S9 | Z Frame up. Close LS6 | 16–17 |
| 17 | Start sweep motor | All pins swept from alley. Close LS7 | 17–18 |
| 18 | Sweep motor reversed | Sweep returns to at-rest position. Close LS8 | 18–1 |

*Table 2.—"Strike" without "foul"*

| In Position No. | Drum Cam Operates— | Resulting Operation | Master Drum Moves from Position to Position |
|---|---|---|---|
| 1 | S3 | X Frame forward. Close LS1 | 1–2 |
| 2 | S5 | Y Frame down. Close LS2 | 2–3 |
| 3 | De-energize S5 | Y Frame up. Close LS3 | 3–4 |
| 4 | De-energize S3 | X Frame back. Close LS4 | 4–5 |
| 5 | | Drum at rest awaits first ball of frame. First ball of frame interrupts beam of electronic relay a short distance ahead of pins. After an appropriate time delay of a few seconds the electronic relay moves the drum to position | 6 |
| 6 | S9 | Z Frame down. Close LS5 | 6–7 |
| 7 | S11 / Time-delay TDR energized | Attempt to clamp pins but no pins to clamp. TDR closes. | 7–8 |
| 8 | Closes DS11 | Strike is discovered and S26 repeater contacts 261 come into circuit and ratchet drum to position. | 17 |
| 17 | Start sweep motor | All pins swept from alley. Close LS7 | 17–18 |
| 18 | Sweep motor reversed | Sweep returns to at-rest position. Close LS8 | 18–1 |

*Table 3.—"Foul" on first ball of frame*

| In Position No. | Drum Cam Operates— | Resulting Operation | Master Drum Moves from Position to Position |
|---|---|---|---|
| 1 | S3 | X Frame forward. Close LS1 | 1-2 |
| 2 | S5 | Y Frame down. Close LS2 | 2-3 |
| 3 | De-energize S5 | Y Frame up. Close LS3 | 3-4 |
| 4 | De-energize S3 | X Frame back. Close LS4 | 4-5 |
| 5 | Drum at rest awaits first ball of frame. "Foul" is committed when first ball is thrown. Drum cam switch DS1F is closed in this position in anticipation of a foul and acts to alter the usual sequence of operations as shown when the relay functions are explained. The ball interrupts the beam of the electronic relay a short distance ahead of the pins. After the usual time delay of a few seconds the electronic relay moves the drum to position | | 6 |
| 6 | Start sweep motor. All pins swept from alley. Close LS7 | | 6-7 |
| 7 | Sweep motor reversed. Sweep returns to at-rest position. Close LS8 | | 7-8 |
| 8 | S3 | X Frame forward. Close LS1 | 8-9 |
| 9 | S5 | Y Frame down. Close LS2 | 9-10 |
| 10 | De-energize S5 | Y Frame up. Close LS3 | 10-11 |
| 11 | De-energize S3 | X Frame back. Close LS4 | 14 |
| | Drum cam switch DS8F is closed through positions 11, 12 and 13 and causes the repeater contacts 261 to move the ratchet of the drum to position | | |
| 14 | Drum at rest awaits second ball of frame. Second ball of frame interrupts beam of electronic relay a short distance ahead of pins. After a few seconds time delay the electronic relay moves the drum from | | 14-15 |
| 15 | S9 | Z Frame lowers to count if a score counter is provided and closes LS5. | 15-16 |
| 16 | De-energize S9 | Z Frame up. Close LS6 | 16-17 |
| 17 | Start sweep motor. All pins swept from alley. Close LS7 | | 17-18 |
| 18 | Sweep motor reversed. Sweep returns to at-rest position. Close LS8 | | 18-1 |

In view of the foregoing, it will be seen that the present invention provides a fully automatic control system for monitoring the operation of bowling-pin-handling mechanisms. An attendant need be present only when the apparatus automatically stops when the pin-spotting mechanism comes into contact with an upright pin which has been abnormally displaced from its original spot position. The control system takes care of all the situations which arise in the game of bowling, such as the presence of standing pins after the first ball of a frame has been rolled, or when a "strike" takes place, that is, when the first rolled ball knocks down all the standing pins on the alley bed.

Also, if a "foul" is committed, that is, when the foot or body of the player moves past the foul line beyond which a player may not advance in rolling a ball, due adjustments are made in the operation of the mechanism. While the mechanism is necessarily complex because of the situations which arise in the game of bowling, nevertheless it is positive and reliable in operation, and if the same should become out of order, the difficulty may be readily traced by one cognizant of the operation of the apparatus and repairs or adjustments quickly made. Usually, a group of bowling alleys will have an experienced attendant available to make such repairs or adjustments when the same become necessary.

While I have described in detail a preferred embodiment of my invention, nevertheless it will be understood that the same is subject to certain modifications without departing from the spirit and scope of the following claims.

I claim:

1. Mechanical pin-handling apparatus for bowling alleys comprising a substantially horizontally disposed bed frame mounted above and adapted for longitudinal travel with respect to a pin-receiving area of a bowling alley bed, stationary tracks arranged at the sides of said bed contiguous to said area and on which said bed frame is mounted for sliding movement, a vertically movable pin-setting apparatus carried by said bed frame, a separate vertically movable pin-raising and lowering mechanism carried by said bed frame in horizontally spaced longitudinal alignment with said pin-setting apparatus, said pin-setting apparatus and said pin-raising and lowering mechanism being registrable with the pin-receiving area of the alley bed by the longitudinal movement of said bed frame, and means carried by said bed frame for raising and lowering said apparatus and mechanism relative to the pin-receiving area of the alley bed.

2. In automatic pin-handling apparatus for bowling alleys, comprising a supporting structure stationarily arranged adjacent to the pin-positioning region of an alley bed, a horizontally arranged carriage frame mounted on said supporting structure above said bed for limited longitudinal movement with respect thereto in a horizontal plane, pin-setting mechanism mounted on and movable bodily with said carriage frame, an independent pin-gripping and raising and lowering mechanism mounted on said carriage frame adjacent to and in the horizontal plane of the pin-setting mechanism, means for moving said carriage frame longitudinally to bring the mechanisms carried thereby selectively into vertical registration with the pin-positioning region of the alley bed, and means for independently raising and lowering said mechanisms with respect to the alley bed and said carriage frame.

3. Automatic pin-handling apparatus for bowling alleys, comprising a supporting structure stationarily mounted adjacent to the pin-positioning region of an alley bed, a horizontally disposed carriage frame mounted on said supporting structure above said bed for limited longitudinal movement in a horizontal plane with respect thereto, a pin-setting mechanism supported by said carriage frame, said mechanism being operable to deposit simultaneously a group of bowling pins in predetermined spaced order on the pin-receiving region of the alley bed, a separately operating pin-gripping and raising and lowering mechanism supported from said carriage frame in the horizontal plane of the pin-setting mechanism and at one side thereof for engagement with pins standing on said bed, said raising and lowering mechanism being operable to move pins engaged thereby to relatively elevated positions above said bed and thereafter return the pins to the bed in precisely the same positions as when the latter were initially engaged by said pin-gripping and raising and lowering mechanism, means for moving said carriage frame longitudinally to bring said mechanisms selectively into vertical registration with the pin-receiving region of said bed, and means for independently raising and lowering said mechanisms with respect to said carriage frame and alley bed when each of said mechanisms assumes a position of vertical alignment with the pin-positioning region of the alley bed.

4. Automatic pin-handling apparatus for bowling alleys comprising a supporting structure stationarily mounted adjacent to the pin-positioning region of an alley bed, a horizontally disposed carriage frame mounted on said supporting structure above said bed for limited longitudinal movement with respect thereto, a fluid-actuated means carried with and adapted for imparting longitudinal movement to said carriage frame, vertically movable relatively independent pin-setting and pin-resetting mechanisms supported by said carriage frame in horizontally aligned and longitudinally spaced order for movement bodily in unison therewith, the operation of said fluid-actuated means serving by moving said carriage frame longitudinally to bring said pin-setting and resetting mechanisms selectively into vertical registration with the pin-setting positioning region of the alley bed, fluid-actuated means supported on said carriage frame for independently raising and lowering said pin-setting and resetting mechanisms relative to the alley bed, electrically energized control valves for governing the operation of said fluid-actuated means, and a program switch operable to effect timed sequential energization of said control valves.

5. Automatic pin-handling apparatus for bowling alleys comprising a supporting structure stationarily arranged adjacent to the pin-positioning region of an alley bed, a horizontally disposed carriage frame mounted on said supporting structure above said bed for limited longitudinal movement with respect thereto, longitudinally aligned and relatively independently operating pin-setting and resetting mechanisms supported by said carriage frame in horizontally aligned, longitudinally spaced order for movement bodily in unison with said frame, a fluid-actuated motor unit mounted on said frame, said unit including a fluid-receiving cylinder, a piston slidably mounted in said cylinder, a piston rod extending from said piston, means for connecting one end of said piston rod with said supporting structure, pipe lines for conducting fluid under pressure from a source of supply to the opposite ends of said cylinder, valve means in said pipe lines for regulating the flow of fluid into said cylinder to produce at timed intervals longitudinal movement of said frame, and complemental valve-controlled fluid actuated motor means carried by said frame for imparting at timed intervals raising and lowering movement to said pin-setting and resetting mechanisms relative to said frame and alley bed.

6. Automatic bowling alley apparatus comprising: a supporting structure stationarily arranged adjacent to the pin-positioning region of an alley bed, a horizontally disposed carriage frame mounted on said supporting structure above said bed for limited longitudinal movement with respect thereto, a separate pin-setting mechanism supported by said carriage frame, said mechanism being operable to deposit simultaneously a group of bowling pins in predetermined spaced order on the pin-receiving region of the alley bed, a pin-resetting mechanism supported on said carriage frame in horizontally aligned, longitudinally spaced order with respect to said pin-setting mechanism for engagement with pins standing on said bed and operable to move pins engaged thereby to relatively elevated positions above said bed and thereafter restore the pins to the bed, electrically controlled means for moving said carriage frame longitudinally to bring said mechanisms selectively into vertical registration with the pin-receiving region of the bed, electrically controlled means for independently raising and lowering the said mechanisms with respect to said carriage frame and alley bed, a sweep mechanism movable longitudinally along the alley bed to remove pins from the latter when said setting and resetting mechanisms occupy relatively elevated positions above said bed, electrically controlled means for moving said sweep mechanism, a main switch having an intermittently rotatable controller drum, electrically actuated means for imparting intermittent rotation to said drum, a plurality of switch units stationarily mounted adjacent to said drum, said switch units having movable actuating elements engageable with cams provided on the periphery of said drum to actuate said switch units, and electrical circuits joined with said switch units and extending to the electrically controlled means for operating said carriage frame, said pin-setting and resetting mechanisms and said sweeping mechanism in timed sequential order.

7. Automatic bowling alley apparatus comprising: a supporting structure stationarily arranged adjacent to the pin-positioning region of an alley bed, a horizontally disposed carriage frame mounted on said supporting structure above said bed for limited longitudinal movement with respect thereto, a separate pin-setting mechanism supported by said carriage frame, said mechanism being operable to deposit simultaneously a group of bowling pins in predetermined spaced order on the pin-receiving region of the alley bed, a pin-resetting mechanism supported from said carriage frame independently of said pin-setting mechanism and in the horizontal plane and to one side of the same for engagement with pins standing on said bed, said resetting mechanism being operable to move pins engaged thereby to relatively elevated positions above said bed and thereafter restore the pins to the bed, electrically controlled means for moving said carriage frame longitudinally to bring said mechanisms selectively into vertical registration with the pin-receiving region of the bed, electrically controlled means for independently raising and lowering the said mechanisms with respect to said carriage frame and alley bed, a sweep mechanism movable longitudinally along the alley bed to remove pins from the latter when said setting and resetting mechanisms occupy relatively elevated positions above said bed, electrically controlled means for moving said sweep mechanism, a main switch having an intermittently rotatable controller drum, electrically actuated means for imparting intermittent rotation to said drum, a plurality of switch units stationarily mounted adjacent to said drum, said switch units having movable actuating elements engageable with cams provided on the periphery of said drum to actuate said switch units, electrical circuits joined with said switch units and extending to the electrically controlled means for operating said carriage frame, said pin-setting and resetting mechanisms and said sweeping mechanism in timed sequential order, and a plurality of limit switches mechanically actuated in accordance with the movement of said carriage frame, pin-setting, pin-resetting and sweeping mechanisms for energizing the drum-actuating means in imparting intermittent rotation to said drum.

8. Automatic pin-handling apparatus for bowling alleys, comprising: a supporting structure stationarily mounted adjacent to the pin-positioning region of an alley bed, a carriage frame mounted on said supporting structure above said bed for limited bodily longitudinal movement thereof in a substantially horizontal plane, a vertically movable pin-setting mechanism mounted on said carriage frame operable to deposit simultaneously a group of bowling pins on the pin-receiving region of the alley bed, a pin-gripping and resetting mechanism independently mounted on said carriage frame with respect to the pin-setting mechanism and in the same horizontal plane therewith, said pin-resetting mechanism being formed for engagement with pins standing on said alley bed to lift the same from said bed, and means for imparting longitudinal movement to said carriage frame to present said mechanisms selectively to positions of registry with the pin-setting region of said alley bed.

9. Automatic pin-handling apparatus for bowling alleys as specified in claim 8, and wherein said apparatus is further characterized by means operative for imparting raising and lowering movement to said separate pin-setting and resetting mechanisms only when the same are in vertical registry with the pin-receiving region of said alley bed.

10. Mechanical pin-handling apparatus for bowling alleys, comprising: a substantially horizontally disposed bed frame mounted above and adapted for longitudinal travel in a horizontal plane with respect to a pin-receiving area of a bowling alley bed, stationary guide means arranged at the sides of said bed contiguous to said area and on which said bed frame is mounted for limited horizontal sliding movement, a vertically movable pin-setting apparatus mounted on said bed frame, a separate vertically movable pin-raising and lowering mechanism carried by said frame in longitudinal and horizontal alignment with said pin-setting apparatus, said pin-setting apparatus and pin-raising and lowering mechanism being selectively alignable with the pin-receiving area of said alley bed through longitudinal movement of said bed frame, means connected with said bed frame for imparting horizontal longitudinal movement thereto in aligning the pin-setting apparatus and the pin-raising and lowering mechanism with the pin-receiving area of the alley bed, and means carried by said frame and connected with said pin-setting apparatus and said pin-raising and lowering mechanism for imparting raising and lowering movement thereto when in vertical alignment with the pin-receiving area of the alley bed.

11. Automatic pin-handling apparatus for bowling alleys, comprising: a supporting structure stationarily mounted adjacent to the pin-positioning region of an alley bed; a horizontally disposed carriage frame mounted on said supporting structure above said bed for limited longitudinal movement with respect thereto; a fluid-actuated means connected with and adapted for imparting longitudinal movement to said carriage frame; independently operating vertically movable pin-setting and pin-resetting mechanisms supported by said carriage frame for movement bodily in unison therewith, the operation of said fluid-actuated means serving by moving said carriage frame longitudinally to bring said pin-setting and resetting mechanisms selectively into vertical registry with the pin-setting positioning region of the alley bed; and fluid-actuated means supported on said carriage frame for independently raising and lowering said pin-setting and resetting mechanisms relative to the alley bed when said mechanisms are in vertical alignment with the pin-positioning region of the bed.

References Cited in the file of this patent

UNITED STATES PATENTS

| | | |
|---|---|---|
| 1,122,622 | McFarland | Dec. 29, 1914 |
| 1,626,446 | Bishop | Apr. 26, 1927 |
| 2,221,697 | Ball | Nov. 12, 1940 |
| 2,294,573 | Potter | Sept. 1, 1942 |
| 2,300,802 | Parra et al. | Nov. 3, 1942 |
| 2,310,218 | Davis | Feb. 9, 1943 |
| 2,346,189 | Schmidt | Apr. 11, 1944 |